United States Patent
Kishigami et al.

(10) Patent No.: US 9,470,784 B2
(45) Date of Patent: Oct. 18, 2016

(54) RADAR DEVICE

(71) Applicant: Panasonic Corporation, Osaka (JP)

(72) Inventors: Takaaki Kishigami, Tokyo (JP);
Hirohito Mukai, Kanagawa (JP)

(73) Assignee: Panasonic Corporation, Osaka (JP)

( * ) Notice: Subject to any disclaimer, the term of this patent is extended or adjusted under 35 U.S.C. 154(b) by 336 days.

(21) Appl. No.: 14/360,285

(22) PCT Filed: Nov. 30, 2012

(86) PCT No.: PCT/JP2012/007717
§ 371 (c)(1),
(2) Date: May 22, 2014

(87) PCT Pub. No.: WO2013/080570
PCT Pub. Date: Jun. 6, 2013

(65) Prior Publication Data
US 2014/0327567 A1 Nov. 6, 2014

(30) Foreign Application Priority Data
Dec. 2, 2011 (JP) .................. 2011-265020

(51) Int. Cl.
*G01S 13/06* (2006.01)
*G01S 13/91* (2006.01)
(Continued)

(52) U.S. Cl.
CPC ............... *G01S 13/06* (2013.01); *G01S 13/02* (2013.01); *G01S 13/22* (2013.01); *G01S 13/284* (2013.01); *G01S 13/91* (2013.01); *G08G 1/056* (2013.01); *G01S 2007/2886* (2013.01)

(58) Field of Classification Search
CPC ...... G01S 13/06; G01S 13/284; G01S 13/02; G01S 13/22; G01S 13/91; G01S 2007/2886; G08G 1/056
USPC ....... 342/146–147, 123, 133, 139, 145, 189, 342/195
See application file for complete search history.

(56) References Cited

U.S. PATENT DOCUMENTS 5,969,641 A * 10/1999 Nakamura ............. G08G 1/017
235/384
7,868,815 B2 1/2011 Fukagawa et al.
(Continued)

FOREIGN PATENT DOCUMENTS

JP 63-059865 A 3/1988
JP 2002-099986 A 4/2002
(Continued)

OTHER PUBLICATIONS

International Search Report dated Dec. 25, 2012, for corresponding International Application No. PCT/JP2012/007717, 3 pages.
(Continued)

*Primary Examiner* — John B Sotomayor
(74) *Attorney, Agent, or Firm* — Seed IP Law Group PLLC

(57) ABSTRACT

Each antenna system processor performs coherent integration on a prescribed number of correlation values between a reception signal and a transmission code. A correlation matrix generator generates a correlation matrix on the basis of coherent integration values. A distance estimator estimates a distance to a target. A direction vector storage is stored with direction vectors each of which includes an azimuth component with respect to a target and an elevation angle component of a line connecting a transmission antenna and the target in which a prescribed direction is used as a reference. An incoming direction estimator estimates a signal incoming direction from the target using the correlation matrix and the direction vectors in which the elevation angle component range is restricted on the basis of the distance to the target.

15 Claims, 17 Drawing Sheets

(51) Int. Cl.
- *G01S 13/22* (2006.01)
- *G08G 1/056* (2006.01)
- *G01S 13/02* (2006.01)
- *G01S 13/28* (2006.01)
- *G01S 7/288* (2006.01)

(56) References Cited

U.S. PATENT DOCUMENTS

| | | | |
|---|---|---|---|
| 8,441,395 B2 | 5/2013 | Kanamoto | |
| 9,234,956 B2* | 1/2016 | Kishigami | G01S 13/42 |
| 2006/0267764 A1 | 11/2006 | Morinaga et al. | |
| 2008/0150784 A1 | 6/2008 | Zhang et al. | |
| 2010/0159842 A1 | 6/2010 | Fukagawa et al. | |
| 2011/0156947 A1 | 6/2011 | Kanamoto | |
| 2014/0085127 A1* | 3/2014 | Kishigami | G01S 13/91 342/108 |
| 2014/0327567 A1* | 11/2014 | Kishigami | G01S 13/91 342/146 |

FOREIGN PATENT DOCUMENTS

| | | |
|---|---|---|
| JP | 2003-149323 A | 5/2003 |
| JP | 2003-194919 A | 7/2003 |
| JP | 2006-329912 A | 12/2006 |
| JP | 2010-002266 A | 1/2010 |
| JP | 2011-137650 A | 7/2011 |

OTHER PUBLICATIONS

Cadzow, "Direction-of-Arrival Estimation Using Signal Subspace Modeling," IEEE Transactions on Aerospace and Electronic Systems, 28(1), Jan. 1992, pp. 64-79.

Kenjirou Chiba, el al., "Experimental Verification of Antenna Array Calibration Using Known Sources," Technical Report of IEICE, Jul. 17, 2002, pp. 7-12, vol. 102, The Institute of Electronics, Information and Communication Engineers, Tokyo, Japan (11 pages).

* cited by examiner

RADAR DEVICE

TECHNICAL FIELD

The present disclosure relates to a radar device which estimates a distance to or a signal incoming direction from a target by receiving a reflection wave signal reflected from the target by a reception antenna.

BACKGROUND ART

Radar devices radiate a radio-frequency radar transmission signal to the space from a measuring site, receive a reflection wave signal reflected from a target, and measure at least one of a distance between the measuring site and the target and a direction of the target. In recent years, radar devices which can estimate a distance to or a signal incoming direction from a target that may be an automobile or a pedestrian by performing a high-resolution measurement using a short-wavelength radar transmission signal such as a signal of microwaves or millimeter waves have been being developed.

Radar devices receive a signal that is a mixture of reflection waves coming from a nearby target and reflection waves coming from a distant target. Range sidelobes occur due to a reflection wave signal coming from a nearby target. If range sidelobes and a main lobe of a reflection wave signal coming from a distant target exist in mixture, the accuracy of detection of the distant target may be lowered.

Therefore, radar devices which are required to perform high-resolution measurement on plural targets are required to transmit a pulse wave or a pulse-modulated wave using a transmission code that has an autocorrelation characteristic with low range sidelobe levels (hereinafter referred to as a low range sidelobe characteristic).

When an automobile and a pedestrian are located at the same distance from a measuring site, a radar device receives a signal that is a mixture of signals of reflection waves coming from the automobile and the pedestrian which have different radar cross sections (RCSs). The radar cross section of a pedestrian is smaller than that of an automobile.

Radar devices are required to properly receive reflection wave signals coming from an automobile and a pedestrian even if they are located at the same distance from a measuring site. Since the signal level of a reflection wave signal varies depending on the distance or type of a target, radar devices are required to have a reception dynamic range wide enough to enable reception of reflection wave signals of various signal levels.

One example conventional radar device is known which transmits pulse waves or pulse-modulated waves through mechanical antenna scanning or electronic scanning with a narrow-directivity beam and receives a reflection wave signal reflected from a target.

Another example conventional radar device is known which receives a reflection wave signal reflected from a target by plural antennas and measures reception phase differences between received reflection wave signals, thereby estimating a signal incoming angle using resolving power that is higher than a value corresponding to beam directivity of each antenna.

In the former radar device, a long antenna scanning time is necessary for detection of a target because it transmits and receives radio waves using the single antenna. Therefore, it is difficult to detect a target so as to follow its movement because detection of a fast-moving target necessitates a high-resolution measurement and hence many scans.

The latter radar device can attain higher detection accuracy than the radar device using a single antenna because it can estimate a signal incoming direction by performing signal processing with decimated scanning intervals. Furthermore, the latter radar device can estimate a signal incoming angle following a movement of even a fast-moving target.

Patent document 1, for example, is known as disclosing a conventional technique in which reflection wave signals that exhibit high correlation are separated from reflection waves received by plural antennas and used for incoming direction angle measurement calculation. In the super-resolution antenna of Patent document 1, reception signals received by plural antennas are subjected to Fourier transform and signal components of respective filter banks corresponding to respective Doppler frequencies generated by the Fourier transform are weighted. In this super-resolution antenna, a desired filter band component is extracted from the weighted signal components and a signal incoming direction from a target is estimated on the basis of the signal component corresponding to the extracted element antenna.

With the above technique, if plural targets exist within a distance resolution, the targets are high in correlation, and Doppler frequencies of the respective targets are sufficiently different from each other, reception signals from the respective targets can be separated from each other and signal incoming directions from the respective targets can be estimated.

PRIOR ART DOCUMENTS

Patent Documents

Patent document 1: JP-A-2003-194919

SUMMARY OF THE INVENTION

Problems to be Solved by the Invention

However, in the above-described Patent document 1, in the case where, for example, a radar device is installed at a high place having a prescribed height from the ground, it is difficult to increase the accuracy of estimation of a signal incoming direction from a target while reducing the amount of calculation for the estimation of a signal incoming direction.

The present disclosure has been made in the above circumstances, and an object of the disclosure is to provide a radar device which can and increase the accuracy of estimation of a signal incoming direction from a target while reducing the amount of calculation for the estimation of a signal incoming direction.

Means for Solving the Problems

This disclosure provides a radar device installed at a position having a prescribed height from the ground, comprising a radar transmitter that converts a transmission code into a radio-frequency radar transmission signal and transmits the radar transmission signal from a transmission antenna which is inclined so as to extend in a prescribed direction which is defined by a line connecting the position having the prescribed height and the ground; and a radar receiver that estimates a signal incoming direction from a target using plural antenna system processors which receive a reflection wave signal produced by reflection of the radar transmission signal by the target, wherein the receiver comprises a correlation matrix generator that generates a correlation matrix including phase difference information which results from an arrangement of reception antennas on the basis of outputs of the plural respective antenna system processors; a distance estimator that estimates a distance to the target on the basis of the outputs of the plural respective antenna system processors; and an incoming direction estimator that determines an elevation angle component with respect to the target on the basis of an output of the distance estimator, and estimates a signal incoming direction from the target using direction vectors in which an azimuth component is varied and an output of the correlation matrix generator.

Advantages of the Invention

This disclosure makes it possible to increase the accuracy of estimation of a signal incoming direction from a target while reducing the amount of calculation for the estimation of a signal incoming direction.

BRIEF DESCRIPTION OF THE DRAWINGS

FIG. 11(a) is for a target in a short range and FIG. 11(b) is for a target located at a distant place.

MODES FOR CARRYING OUT THE INVENTION

Radar devices according to respective embodiments of the disclosure will be described with reference to the drawings.
(Background of Embodiments)

First, before describing the radar devices according to respective embodiments of the disclosure, the background of the embodiments will be described with reference to the drawings.

Figure 13:
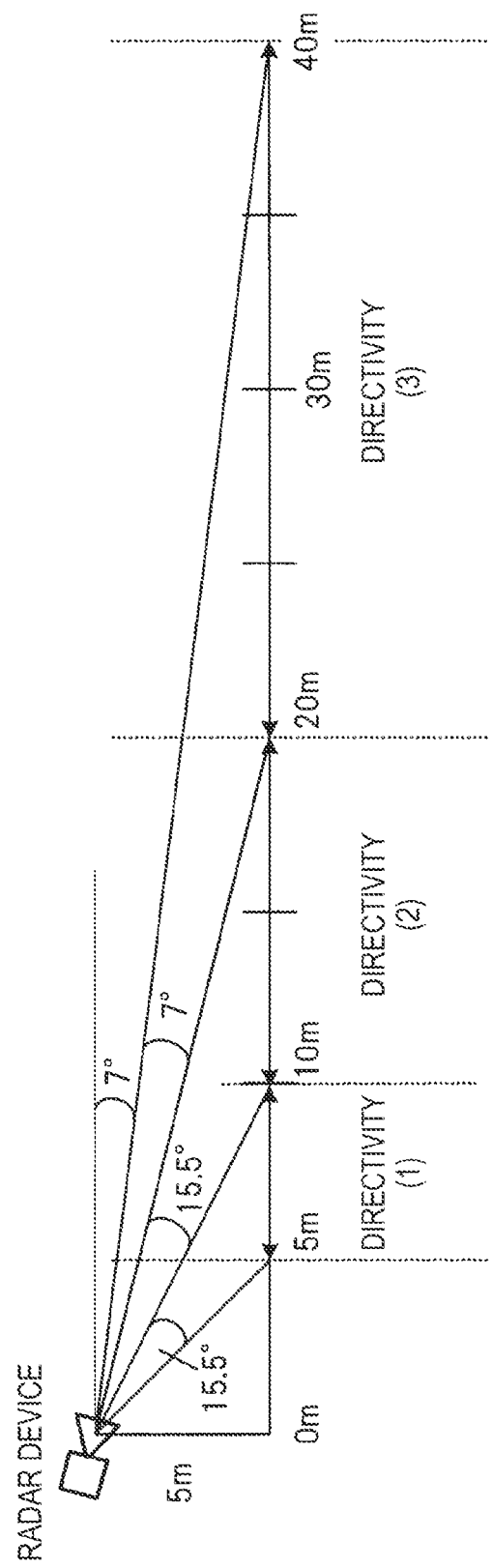
FIG. 13 shows an example measurement area of a case that a conventional radar device is installed at a high place having a height of 5 m from the ground.

A description will be made of a case that as illustrated in FIG. 13 a conventional radar device is installed at a high place having a height of 5 m, for example, from the ground and measurements are done for an area that is in a distance range from a short distance (e.g., 5 m) to a long distance (e.g., 40 m). FIG. 13 shows an example measurement area of a case that a conventional radar device is installed at a high place having a height of 5 m from the ground.

Figure 14:
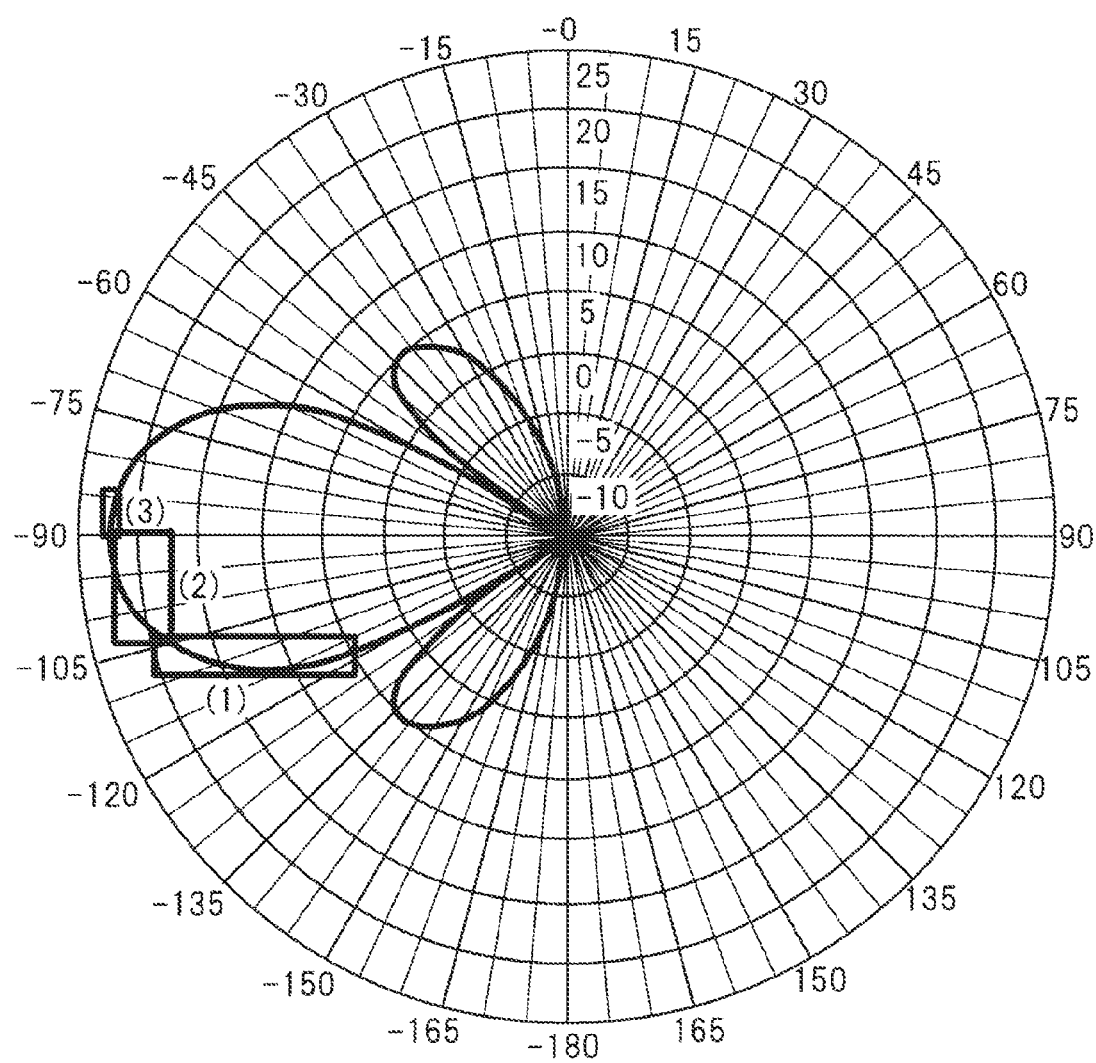
FIG. 14 shows an example directivity characteristic of an antenna in the elevation angle direction.

The direction vector corresponding to reception phase difference information between antennas which is determined by the signal incoming angle θ of a target and the intervals between plural antennas is influenced by deviations between antennas of a directivity pattern in a vertical plane of the reception antenna (see FIG. 14). That is, the direction vector includes not only a component of deviations between antenna elements that depends on the azimuth direction but also a component of deviations between antenna elements that depends on the elevation angle direction. FIG. 14 shows an example directivity characteristic of an antenna in the elevation angle direction.

More specifically, where a vertically directional beam whose width is as narrow as about 25° is employed, when the antenna of the conventional radar device is inclined downward by 7°, it has a vertical detection range of 38° for an area that is in a distance range from a short distance (e.g., 5 m) to a long distance (e.g., 40 m). Directivity ranges (1)-(3) shown in FIG. 14 are used for ranges of 5-10 m, 10-20 m, and 20-40 m shown in FIG. 13, respectively.

Therefore, in the conventional radar device, an antenna directivity range that is not part of the directivity range of a main beam for a certain distance range where a target exists. In such a case, a direction vector is affected by deviations between antennas of a directivity pattern in a vertical plane of the reception antenna elements (see FIG. 14, for example) and includes a component of deviations between antenna elements that depends on the azimuth direction but also a component of deviations between antenna elements that depends on the elevation angle direction.

As a result, differences occur in direction estimation accuracy for targets located at different distances. This is a factor in causing a variation in the direction estimation accuracy of the radar device.

The above problem is solved in the following manner. Components of deviations between antennas can be corrected for by having direction vectors include amplitude and phase deviation information that depends on the azimuth θ direction and the elevation angle φ direction and occurs between the reception antenna elements. This makes it possible to estimate an incoming direction of a reflection wave signal from a target after lowering the dependency of the direction estimation accuracy on the elevation angle φ direction.

However, where a conventional radar device is installed at a high place, the use of the two respective variables in the azimuth θ direction and the elevation angle φ direction increases the amount of calculations of evaluation function values for estimation of a signal incoming direction. For example, if the variation ranges in the azimuth θ direction and the elevation angle φ direction are divided into N sections and M sections, respectively, the amount of calculations of evaluation function values is increased because of N×M times of calculations.

In the above circumstances, the following embodiments are directed to example radar devices which increase the accuracy of estimation of a signal incoming direction from a target while reducing the amount of calculation for the estimation of a signal incoming direction.

(Embodiment 1)

Figure 1:
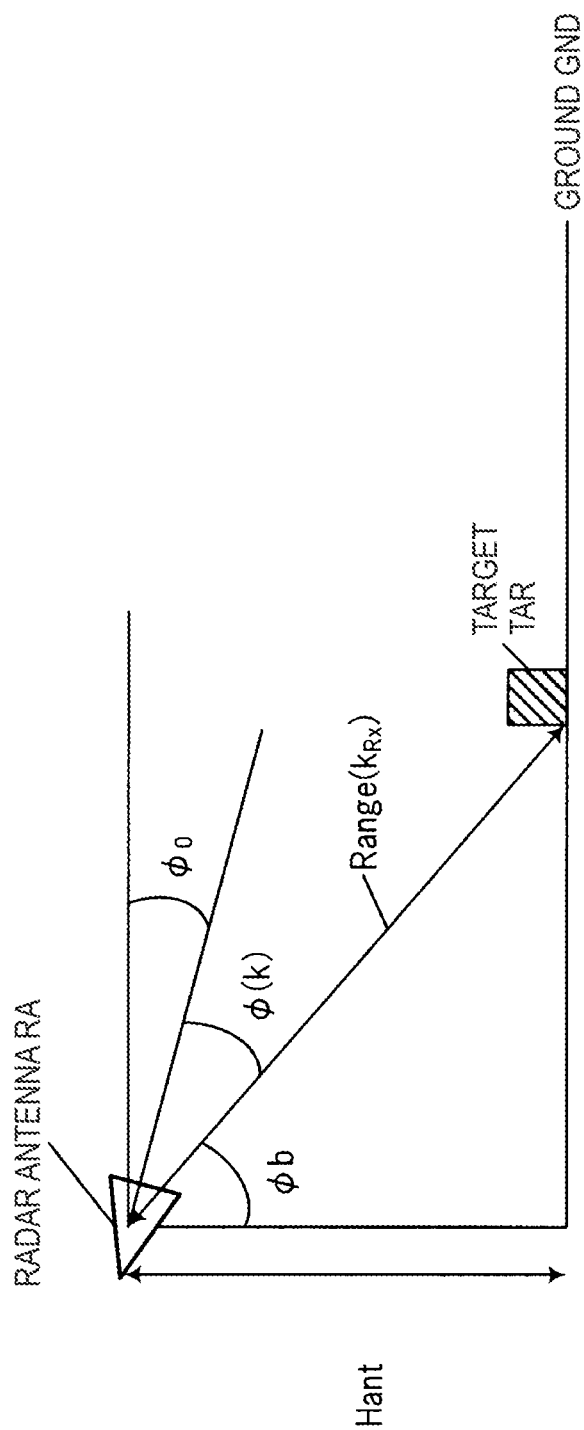
FIG. 1 is an explanatory diagram showing a straight line extending in the direction of an inclination angle $\phi_0$ and an elevation angle $\phi(k_{Rx})$ with respect to a target of a radar device according to a first embodiment.

A radar device 1 according to a first embodiment will be described with reference to FIGS. 1-5. FIG. 1 is an explanatory diagram showing a straight line extending in the direction of an inclination angle $\phi_0$ and an elevation angle $\phi(k_{Rx})$ with respect to a target of the radar device 1 according to the first embodiment. In the following description, a transmission antenna Tx-ant and plural reception antennas Rx-ant1 to Rx-ant4 will be together referred to as a radar antenna RA. The plural reception antennas Rx-ant1 to Rx-ant4 form an array antenna. To simplify the description, the radar antenna RA of the radar device 1 is shown in FIG. 1.

Figure 2:
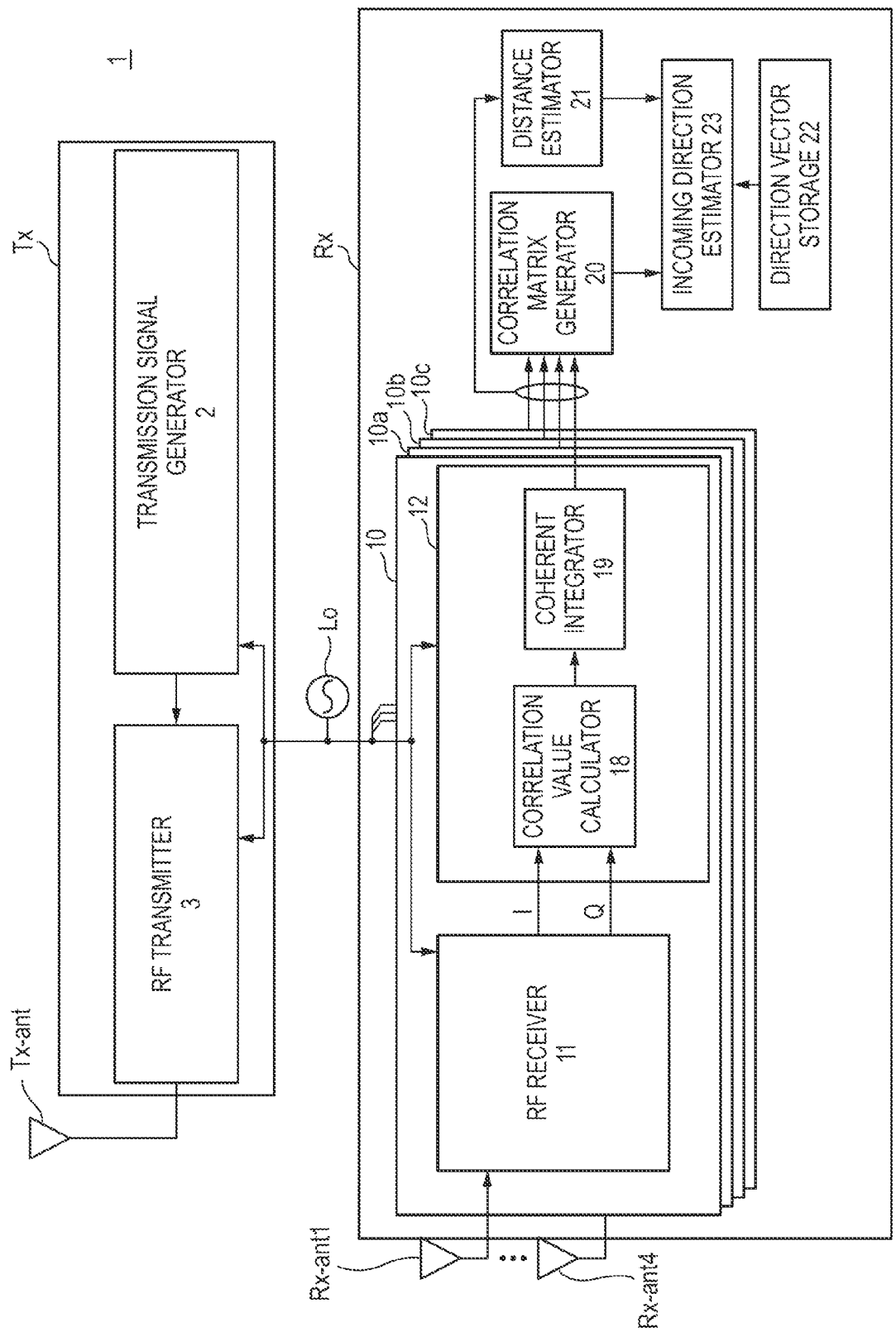
FIG. 2 is a block diagram showing the internal configuration of the radar device according to the first embodiment in a simplified manner.
Figure 3:
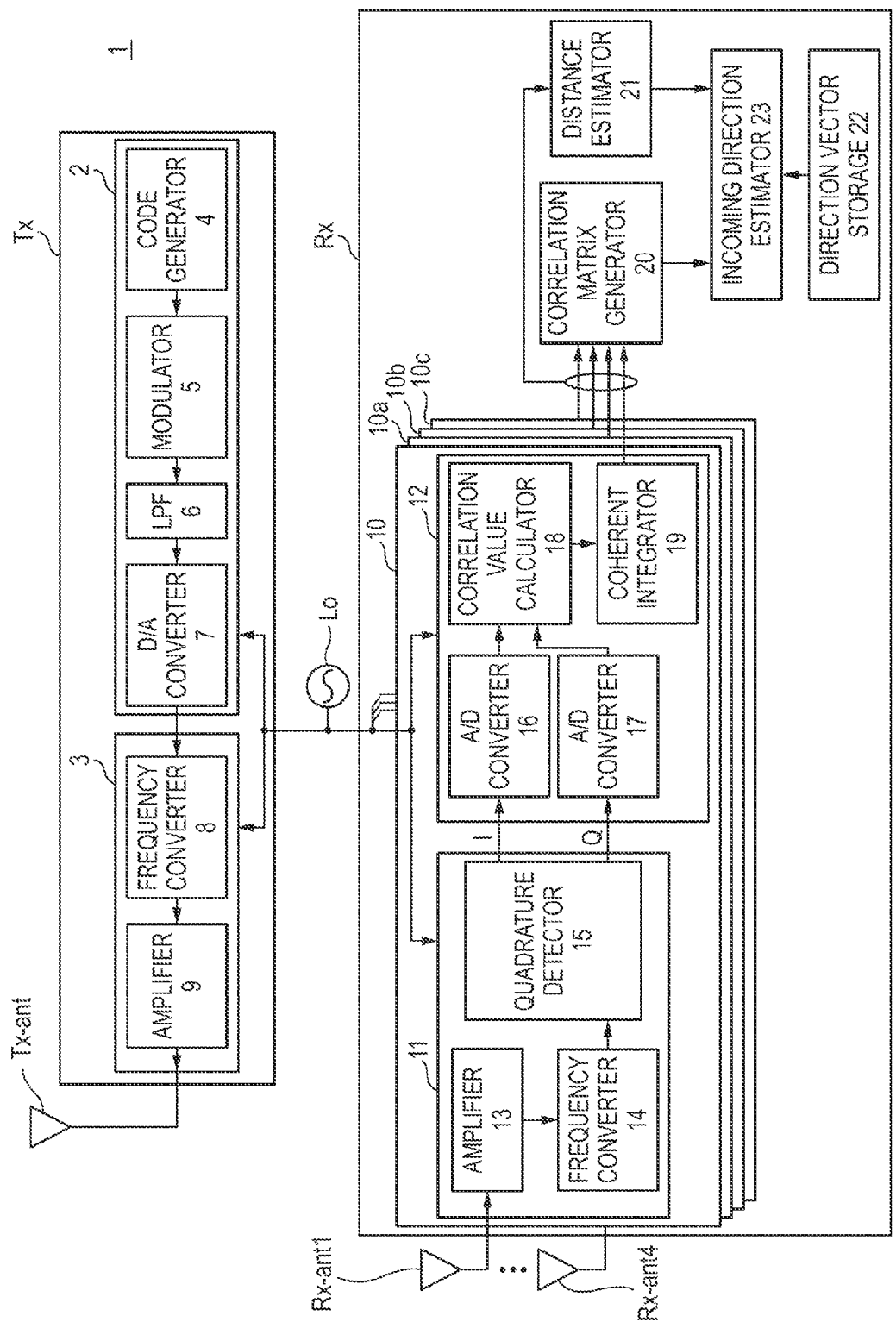
FIG. 3 is a block diagram showing the internal configuration of the radar device according to the first embodiment in detail.
Figure 4:
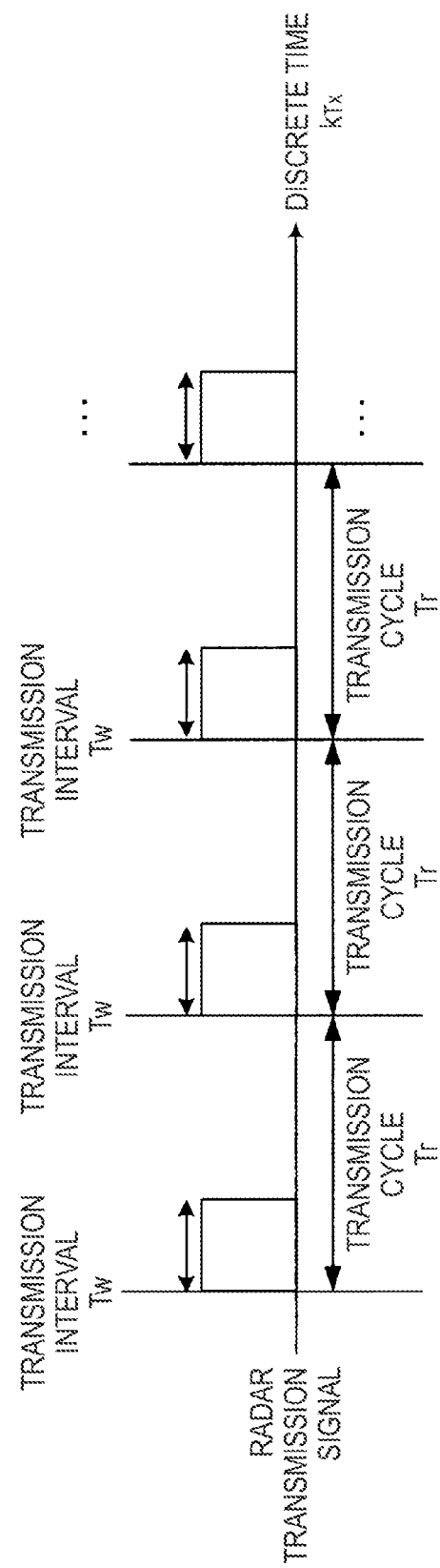
FIG. 4 shows a relationship between transmission intervals and transmission cycles of a radar transmission signal.
Figure 5:
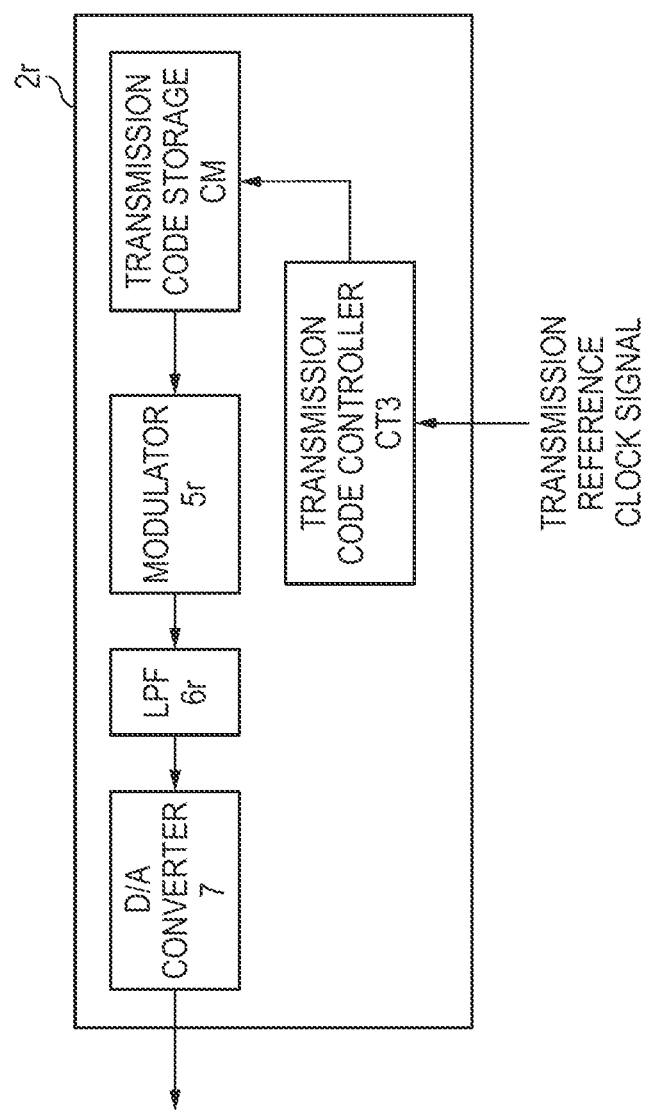
FIG. 5 is a block diagram showing the internal configuration of a modified version of a transmission signal generator.

FIG. 2 is a block diagram showing the internal configuration of the radar device 1 according to the first embodiment in a simplified manner. FIG. 3 is a block diagram showing the internal configuration of the radar device 1 according to the first embodiment in detail. FIG. 4 shows a relationship between transmission intervals Tw and transmission cycles Tr of a radar transmission signal. FIG. 5 is a block diagram showing the internal configuration of a transmission signal generator 2r as a modification of a transmission signal generator 2.

The radar device 1 is installed at a position having a prescribed height $H_{ant}$ from the ground GND. In the following description, the prescribed height $H_{ant}$ will be referred to as an installation height $H_{ant}$. The radar antenna RA of the radar device 1 is inclined so as to extend in the direction of an inclination angle $\phi_0$ that is defined by a line connecting the position having the installation height $H_{ant}$ and the ground. The radar device 1 transmits a radar transmission signal generated by a radar transmitter Tx from the transmission antenna Tx-ant and receives, by the array antenna, a signal of reflection waves produced by reflection of the radar transmission signal by the target TAR. The radar device 1 estimates a distance between itself and the target TAR and a signal incoming direction from the target TAR by performing signal processing on the signal received by the array antenna.

The target TAR is an object to be detected by the radar device 1 and may be an automobile or a human. This also applies to each of the following embodiments.

First, how the individual units of the radar device 1 are configured will be described in a simplified manner.

As shown in FIG. 2, the radar device 1 is configured so as to include a reference signal oscillator Lo, the radar transmitter Tx, and a radar receiver Rx. The radar transmitter Tx is configured so as to have a transmission signal generator 2 and a RF transmitter 3 which is connected to the transmission antenna Tx-ant. The reference signal oscillator Lo is connected to the radar transmitter Tx and the radar receiver Rx and supplies a common signal to them, whereby pieces of processing of the radar transmitter Tx and the radar receiver Rx are synchronized with each other.

The radar receiver Rx is configured so as to have four antenna system processors 10, 10a, 10b, and 10c, a correlation matrix generator 20, a distance estimator 21, a direction vector storage 22, and an incoming direction estimator 23. Although the radar receiver Rx shown in FIG. 2 has the four antenna system processors, the number of antenna system processors is not limited to four and may be two or more. Since the antenna system processors have the same configuration, the antenna system processor 10 will be described below as an example.

The antenna system processor 10 is configured so as to have a RF receiver 11 to which the reception antenna Rx-ant1 is connected and a signal processor 12. The signal processor 12 is configured so as to have at least a correlation value calculator 18 and a coherent integrator 19.

Next, how the individual units of the radar transmitter Tx are configured will be described in detail with reference to FIG. 3.

As shown in FIG. 3, the radar transmitter Tx is configured so as to have the transmission signal generator 2 and the RF transmitter 3 to which the transmission antenna Tx-ant is connected.

As shown in FIG. 3, the transmission signal generator 2 is configured so as to include a code generator 4, a modulator 5, an LPF (lowpass filter) 6, and a D/A converter 7. Although in FIG. 3 the LPF 6 is included in the transmission signal generator 2, the LPF 6 may be provided inside the radar transmitter Tx so as to be disposed outside the transmission signal generator 2 and receive an output of the D/A converter 7.

As shown in FIG. 3, the RF transmitter 3 is configured so as to include a frequency converter 8 and an amplifier 9.

Next, how the individual units of the radar transmitter Tx operate will be described in detail.

The transmission signal generator 2 generates a transmission reference dock signal by multiplying a reference signal generated by the reference signal oscillator Lo by a prescribed number. The individual units of the transmission signal generator 2 operate on the basis of the generated transmission reference dock signal.

As shown in FIG. 4, a transmission signal is generated by the transmission signal generator 2 in such a manner that, for example, each code element of a code sequence $C_n$ having a code length L is modulated using No samples of the transmission reference dock signal in a transmission interval Tw (s) of each transmission cycle Tr. That is, the sampling rate of the transmission signal generator 2 is equal to (No×L)/Tw. Therefore, in each transmission interval Tw, modulation is done using Nr (=No×L) samples. In the silent interval (Tr−Tw) (s) of each transmission cycle Tr, modulation is done using Nu samples.

The transmission signal generator 2 periodically generates a baseband transmission signal $r(k_{Tx}, M)$ (see Equation (1)) by modulating the code sequence $C_n$ having the code length L. Parameter n takes values 1 to L, and parameter L represents the code length of the code sequence C. Parameter j is the imaginary number unit which satisfies $j^2=-1$. Parameter $k_{Tx}$ represents discrete time representing modulation timing for generation of a transmission signal in the radar transmitter Tx, and takes values 1 to Nr+Nu.

Parameter M represents the ordinal number of the transmission cycle Tr of a radar transmission signal. The transmission signal $r(k_{Tx}, M)$ is a transmission signal at the discrete time $k_{Tx}$ of an Mth transmission cycle Tr, and is an addition result of an in-phase signal component $I(k_{Tx}, M)$ and the product of the imaginary number unit j and a quadrate signal component $Q(k_{Tx}, M)$ (see Equation (1)).

[Formula 1]

$$r(k_{Tx}, M) = I(k_{Tx}, M) + jQ(k_{Tx}, M) \quad (1)$$

The code generator 4 generates a transmission code of the code sequence $C_n$ having the code length L every transmission cycle Tr. For example, the elements of the code sequence $C_n$ are formed using two values [−1, 1] or four values [1, −1, j, −j]. For the radar device 1 to have a low range sidelobe characteristic, it is preferable that the transmission code is a code including at least one of, for example, a pair of code sequences of a complementary code, a Barker code sequence, a Golay code sequence, an M-sequence code, and code sequences constituting a Spano code. The code generator 4 outputs the generated code sequence $C_n$ to the modulator 5. In the following description, for the sake of convenience, the transmission code of the code sequence $C_n$ will be written as a transmission code $C_n$.

To generate a pair of transmission codes of a complementary code as the transmission code $C_n$, the code generator 4 generates a pair of transmission codes $P_n$ and $Q_n$ every two transmission cycles (2Tr) so as to generate them alternately (one of them is generated in each transmission cycle). That is, in an Mth transmission cycle, the code generator 4 generates the one transmission code $P_n$ of the pair of transmission codes of the complementary code and outputs it to the modulator 5. In the next, (M+1)th transmission cycle, the code generator 4 generates the other transmission code $Q_n$ of the pair of transmission codes of the complementary code and outputs it to the modulator 5. Likewise, in the (M+2)th and following transmission cycles, the code generator 4 generates the transmission codes $P_n$ and $Q_n$ repeatedly and outputs them to the modulator 5 every two transmission cycles which are the same in length as the Mth and (M+1)th transmission cycles.

The modulator 5 receives the transmission code $C_n$ that is output from the code generator 4. The modulator 5 generates a baseband transmission signal of Equation (2) by pulse-modulating the received transmission code $C_n$. The pulse modulation is amplitude modulation, ASK (amplitude shift keying) or phase modulation (PSK (phase shift keying)). This also applies to each of the following embodiments.

For example, where the code sequence $C_n$ uses two values [−1, 1], the phase modulation (PSK) becomes BPSK (binary phase shift keying). Where the code sequence $C_n$ uses four values [1, −1, j, −j], the phase modulation (PSK) becomes QPSK (quadrature phase shift keying) or 4-phase PSK. That is, in the phase modulation (PSK), prescribed modulation symbols of a constellation on the IQ plane are assigned.

The modulator 5 outputs a transmission signal $r(k_{Tx}, M)$, in a preset limited band or lower, of the generated transmission signal $r(k_{Tx}, M)$ to the D/A converter 7 via the LPF 6. The LPF 6 may be omitted in the transmission signal generator 2. This also applies to each of the following embodiments.

The D/A converter 7 converts the digital transmission signal $r(k_{Tx}, M)$ that is output from the modulator 5 into an analog transmission signal. The D/A converter 7 outputs the analog transmission signal to the RF transmitter 3.

The RF transmitter 3 generates a transmission reference signal in a carrier frequency band by multiplying the reference signal generated by the reference signal oscillator Lo by a prescribed number. The individual units of the RF transmitter 3 operate on the basis of the generated transmission reference signal.

The frequency converter 8 receives the analog transmission signal that is output from the D/A converter 7, and up-converts the received baseband transmission signal using the transmission reference signal. The frequency converter 8 thus generates a radio-frequency radar transmission signal and outputs the generated radar transmission signal to the amplifier 9.

The amplifier 9 receives the radar transmission signal that is output from the frequency converter 8, amplifies the signal level of the received radar transmission signal to a prescribed signal level, and outputs the amplified signal to the transmission antenna Tx-ant. The amplified radar transmission signal is transmitted from the transmission antenna Tx-ant.

The transmission antenna Tx-ant transmits the radar transmission signal that is output from the RF transmitter 3. As shown in FIG. 4, the radar transmission signal is transmitted during the transmission interval Tw of each transmission cycle Tr and is not transmitted during the silent interval Tr−Tw.

The common reference signal produced by multiplying the reference signal generated by the reference signal oscillator Lo by the prescribed number is supplied to the RF transmitter 3 and the RF receivers of the respective antenna system processor 10, 10a, 10b, and 10c. This allows the RF transmitter 3 and the plural RF receivers to operate in synchronism with each other.

Another configuration is possible in which the code generator 4 is not provided in the transmission signal generator 2 and, instead, a transmission code storage CM for storing a transmission code $C_n$ generated by the transmission signal generator 2 in advance, is provided (see FIG. 5). For a case that the code generator 4 generates a pair of transmission codes of a complementary code, the transmission code storage CM may be stored with, for example, a pair of transmission codes of a complementary code such as transmission codes $A_n$ and $B_n$. The transmission code storage CM is applicable to not only the first embodiment but also each of the following embodiments. A transmission signal generator 2r shown in FIG. 5 is configured so as to include the transmission code storage CM, a transmission code controller CT3, a modulator 5r, an LPF 6r, and a D/A converter 7.

The transmission code controller CT3 reads the transmission code $C_n$ (or the transmission codes $A_n$ and $B_n$ as a pair of transmission codes of a complementary code) from the transmission code storage CM cyclically every transmission cycle Tr on the basis of the reference dock signal produced by multiplying the reference signal generated by the reference signal oscillator Lo by the prescribed number, and outputs the read-out transmission code $C_n$ to the modulator 5r. Operations performed after the output to the modulator 5r are the same as performed by the above-described modulator 5 and LPF 6, and hence descriptions therefor will be omitted.

(Radar Receiver)

Next, how the individual units of the radar receiver Rx are configured will be described with reference to FIG. 3.

As shown in FIG. 3, the radar receiver Rx is configured so as to include the four antenna system processors 10, 10a, 10b, and 10c, for example, which correspond in number to the reception antennas constituting the array antenna, the correlation matrix generator 20, the distance estimator 21, the direction vector storage 22, and the incoming direction estimator 23.

The four antenna system processor 10 is configured so as to include the RF receiver 11 to which the reception antenna Rx-ant1 is connected and the signal processor 12. The RF receiver 11 is configured so as to have an amplifier 13, a frequency converter 14, and a quadrature detector 15. The signal processor 12 is configured so as to have two A/D converters 16 and 17, the correlation value calculator 18, and the coherent integrator 19. The radar receiver 3 performs a calculation periodically with each transmission cycle Tr as a signal processing interval of the signal processors of the respective antenna system processors.

Next, how the individual units of the radar receiver Rx operate will be described in detail.

The reception antenna Rx-ant1 receives a reflection wave signal that is a radar transmission signal transmitted from the radar transmitter Tx and reflected by a target TAR. The reception signal received by the reception antenna Rx-ant1 is input to the RF receiver 11.

Like the RF transmitter 3, the RF receiver 11 generates a reception reference signal in the carrier frequency band by multiplying the reference signal generated by the reference signal oscillator $Lo_s$ by a prescribed number. The individual units of the RF receiver 11 operate on the basis of the generated reception reference signal.

The amplifier 13 receives the radio-frequency reception signal received by the reception antenna Rx-ant1, amplifies the signal level of the received reception signal, and outputs the resulting signal to the frequency converter 14.

The frequency converter 14 receives the reception signal that is output from the amplifier 13, and down-converts the radio-frequency reception signal using the received radio-frequency reception signal and the reception reference signal. The frequency converter 14 thus generates a baseband reception signal and outputs the generated baseband reception signal to the quadrature detector 15.

The quadrature detector 15 generates a baseband reception signal consisting of an in-phase signal and a quadrate signal by quadrature-detecting the reception signal that is output from the frequency converter 14. The quadrature detector 15 outputs the in-phase signal and the quadrate signal of the generated reception signal to the respective A/D converters 16 and 17.

The A/D converter 16 samples, every discrete time $k_{Rx}$, the baseband in-phase signal that is output from the quadrature detector 15, and thereby converts the in-phase signal (analog data) into digital data. The AD converter 16 outputs the resulting in-phase signal component (digital data) to the correlation value calculator 18.

The A/D converter 16 performs sampling Ns times per pulse width (pulse duration) Tp (=Tw/L) of a transmission signal $r(k_{Tx}, M)$ generated by the radar transmitter Tx. That is, the sampling rate of the AD converter 16 is equal to (Ns×L)/Tw=Ns/Tp.

Likewise, the AD converter 17 samples, every discrete time $k_{Rx}$, the baseband quadrate signal that is output from the quadrature detector 15, and thereby converts the quadrate signal (analog data) into digital data. The AD converter 17 outputs the resulting quadrate signal component (digital data) to the correlation value calculator 18.

The AD converter 17 performs sampling Ns times per pulse width (pulse duration) Tp (=Tw/L) of the transmission signal $r(k_{Tx}, M)$ generated by the radar transmitter Tx. That is, the sampling rate of the AD converter 17 is equal to Ns/Tp.

In the following, a reception signal at a discrete time $k_{Rx}$ of an Mth transmission cycle Tr produced by the AD converters 16 and 17 is expressed as a complex signal $x(k_{Tx}, M)$ (see Equation (2)) using an in-phase signal component $Ir(k_{Tx}, M)$ and a quadrate signal component $Qr(k_{Tx}, M)$ of the reception signal:

[Formula 2]

$$x(k_{Rx},M)=Ir(k_{Rx},M)+jQr(k_{Rx},M) \qquad (2)$$

In the following description, a start time point of each radar transmission cycle Tr is used as a reference ($k_{Rx}=1$) of the discrete time $k_{Rx}$ and the signal processor 12 operates periodically until a sampling point k=(Nr+Nu)×Ns/No that is immediately before the end of each radar transmission cycle Tr.

That is, the signal processor 12 operates periodically in a period in which the discrete time $k_{Rx}$ varies from 1 to (Nr+Nu)×Ns/No. A discrete time $k_{Rx}$=Nr×Ns/No represents a time point immediately before the end of the transmission interval Tw of each transmission cycle Tr. In the following description, a digital reception signal $x(k_{Tx}, M)$ that is output from the AD converters 16 and 17 will be referred to as a discrete sample value $x(k_{Tx}, M)$.

The correlation value calculator 18 receives discrete sample values $Ir_{Tx}, M)$ and $Qr(k_{Tx}, M)$ that are output from the ND converters 16 and 17, that is, a discrete sample value $x(k_{Tx}, M)$ as a reception signal. Based on the reception reference dock signal produced by multiplying the reference signal by the prescribed number, the correlation value calculator 18 periodically generates, every set of discrete times $k_{Rx}$, a transmission code $C_n$ having the code length L that is transmitted in each transmission cycle Tr shown in the first stage of FIG. 6. Parameter n takes values 1 to L. Parameter L represents the code length of the code sequence $C_n$. The first stage of FIG. 6 shows transmission timing of a radar transmission signal.

The correlation value calculator 18 calculates a sliding correlation value $AC(k_{Rx}, m)$ between the received reception signal $x(k_{Rx}, M))$ and the transmission code $C_n$. Symbol $AC(k_{Rx}, m)$ represents a sliding correlation value at a discrete time $k_{Rx}$.

Figure 6:
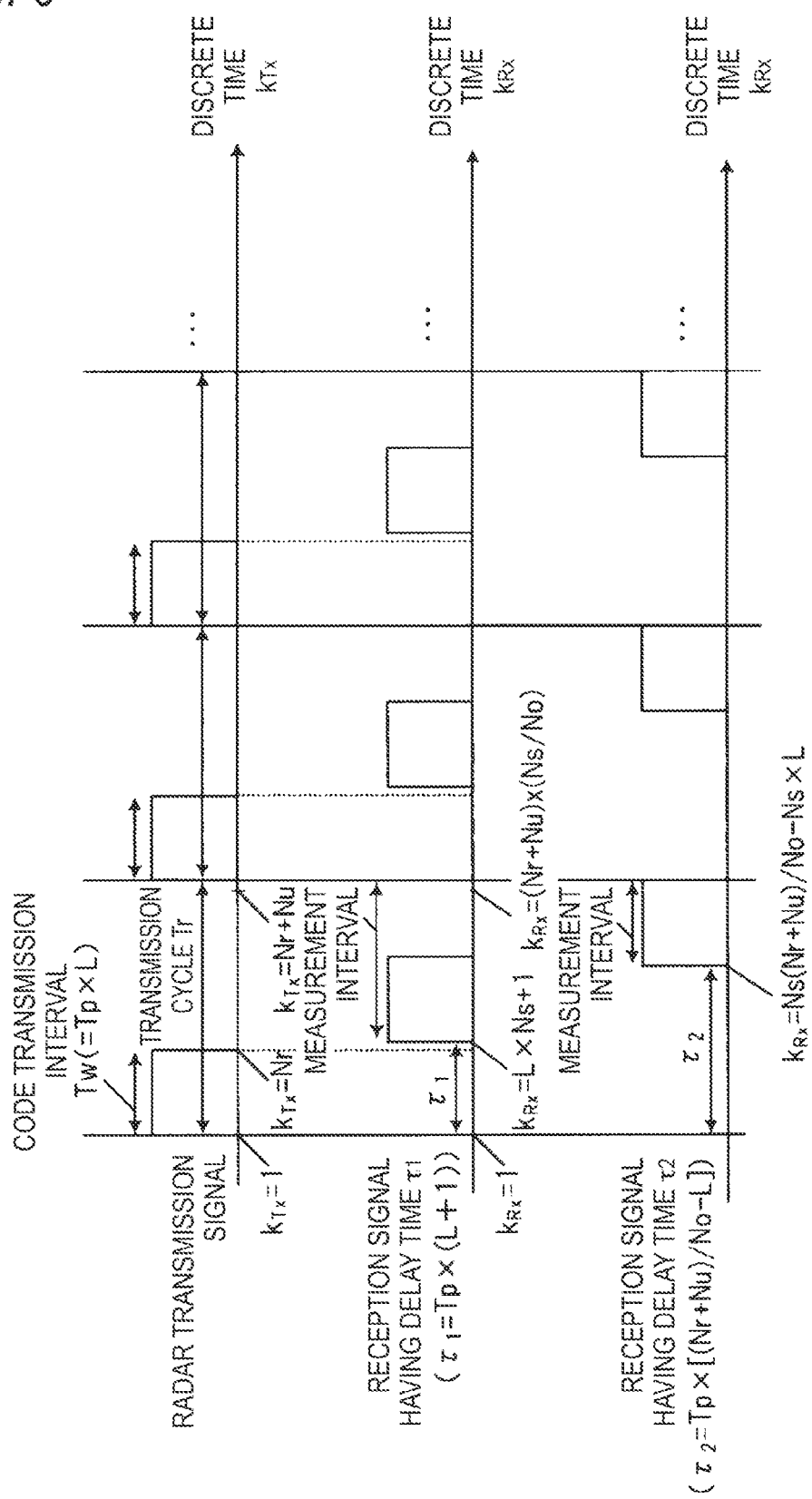
FIG. 6 shows relationships between a radar transmission signal, a reception signal having a delay time $\tau_1$, and a reception signal having a delay time $\tau_2$.

More specifically, the correlation value calculator 18 calculates sliding correlation values $AC(k_{Rx}, M)$ in each transmission cycle $T_r$ shown in the second stage of FIG. 6, that is, for respective discrete times $k_{Rx}$ (=1 to (Nr+Nu)× Ns/No), according to Equation (3). The correlation value calculator 18 outputs the sliding correlation values $AC(k_{Rx}, M)$ calculated according to Equation (3) to the coherent integrator 19.

The second stage and the third stage of FIG. 6 show reception timing of a radar transmission signal. The second stage of FIG. 6 shows a measurement period in a case that a reception signal is received by the array antenna after a lapse of a delay time $\tau_1$ from the start of transmission of a radar transmission signal. The third stage of FIG. 6 shows a measurement period in a case that a reception signal is received by the array antenna after a lapse of a delay time $\tau_2$ from the start of transmission of a radar transmission signal.

The delay times $\tau_1$ and $\tau_2$ are given by Equations (4) and (5), respectively.

[Formula 3]

$$AC(k_{Rx}, M) = \sum_{n=1}^{L} x(k_{Rx} + Ns(n-1), M)C_n^* \quad (3)$$

[Formula 4]

$$\tau_1 = Tp \times (L+1) \quad (4)$$

[Formula 5]

$$\tau_2 = Tp \times \left\{ \frac{(Nr + Nu)}{No} - L \right\} \quad (5)$$

In each of the embodiments including this embodiment, the correlation value calculator 18 performs calculations at discrete times $k_{Rx}=1$ to $(Nr+Nu) \times Ns/No$. The measurement range (the range of discrete times $k_{Rx}$) may be narrowed in accordance with the range of presence of the target TAR to be measured by the radar device 1. With this measure, in the radar device 1, the amount of calculation of the correlation value calculator 18 can be reduced further.

That is, in the radar device 1, the power consumption can be reduced further as a result of reduction in the calculation amount of the signal processor 12.

In the radar device 1, where the correlation value calculator 18 calculates sliding correlation values $AC_s(k_s, m_s)$ at discrete times $k_{Rx}=Ns(L+1)$ to $(Nr+Nu) \times Ns/No-NsL$, measurement of a reflection wave signal in each transmission interval $T_w$ of a radar transmission signal can be omitted.

In the radar device 1, even if a radar transmission signal goes around to enter the radar receiver Rx directly, a measurement can be performed with its influence eliminated. With the above restriction of the measurement range (the range of discrete times $k_s$), the coherent integrator 19, the correlation matrix generator 20, the distance estimator 21, and the incoming direction estimator 23 also operate in the same restricted measurement range. Therefore, the processing amounts of these units can be reduced and hence the power consumption of the radar device 1 can be lowered.

The coherent integrator 19 receives the sliding correlation values $AC(k_{Rx}, M)$ that are output from the correlation value calculator 18. The coherent integrator 19 adds together sliding correlation values $AC(k_{Rx}, M)$ in a prescribed number (Np) of transmission cycles $T_r$ (a period $Np \times T_r$) on the basis of sets of sliding correlation values $AC(k_{Rx}, M)$ that have been calculated in the Mth transmission cycle $T_r$ for the respective discrete times $k_s$.

More specifically, the coherent integrator 19 calculates an mth coherent integration value $Cl(k_{Rx}, m)$ for each discrete time $k_s$ by adding together, for each discrete time $k_s$, sliding correlation values $AC(k_{Rx}, M)$ in the prescribed number (Np) of transmission cycles $T_r$ (period $Np \times T_r$) according to Equation (6). Parameter Np represents the number of times of coherent integration performed in the coherent integrator 19. Parameter m is the ordinal number of each set of Np times of coherent integration performed by the coherent integrator of each antenna system processor. The coherent integrator 19 outputs the calculated coherent integration values $Cl(k_{Rx}, m)$ to the correlation matrix generator 20.

[Formula 6]

$$Cl(k_{Rx}, m) = \sum_{q=1}^{Np} AC(k_{Rx}, Np(m-1)+q) \quad (6)$$

Adding together Np sliding correlation values $AC(k_{Rx}, M)$, the coherent integrator 19 can suppress noise components contained in a reflection wave signal and thereby improve the reception quality (SNR: signal to noise radio) of the reflection wave signal. Furthermore, capable of improving the reception quality of the reflection wave signal, the coherent integrator 19 can increase the accuracy of estimation of a signal incoming direction from the target TAR.

The correlation matrix generator 20 receives coherent integration values $Cl^1(k_{Rx}, m), \ldots, Cl^4(k_{Rx}, m)$ that are output from the coherent integrators of the antenna system processors 10, 10a, 10b, and 10c, respectively. The correlation matrix generator 20 generates a correlation matrix $H(k_{Rx}, m)$ for each discrete time $k_{Rx}$ according to Equation (7) to detect phase differences between the reception antennas of the reflection wave signal coming from the target TAR. In Equation (7), the superscript H is the complex conjugate transpose operator.

[Formula 7]

$$H(k_{Rx}, m) = \begin{bmatrix} Cl^1(k_{Rx}, m) \\ Cl_p^2(k_{Rx}, m) \\ \vdots \\ Cl^4(k_{Rx}, m) \end{bmatrix} \begin{bmatrix} Cl^1(k_{Rx}, m) \\ Cl^2(k_{Rx}, m) \\ \vdots \\ Cl^4(k_{Rx}, m) \end{bmatrix}^H \quad (7)$$

Furthermore, the correlation matrix generator 20 calculates a correlation matrix $B(k_{Rx})$ by adding together (averaging) Dp correlation matrices in Nf transmission cycles Tr (a period Nf×Tr) according to Equation (8).

[Formula 8]

$$B(k_{Rx}) = \sum_{m=1}^{Dp} H(k_{Rx}, m) \quad (8)$$

Parameter Dp represents the number of correlation matrices that are added together (averaged) by the correlation matrix generator 20 in the Nf transmission cycles Tr (period Nf×Tr), and satisfies Equation (9). The correlation matrix generator 20 outputs the correlation matrix $B(k_{Rx})$ calculated by the addition (averaging) to the incoming direction estimator 23.

[Formula 9]

$$Dp = \frac{Nf}{Np} \quad (9)$$

The correlation matrix generator 20 may calculate a correlation vector according to Equation (10) rather than Equation (7) by using, as a reference phase, a phase of a signal received by the reception antenna of one of the plural antenna system processors 10, 10a, 10b, and 10c. In Equation (10), the asterisk "*" (superscript) is the complex conjugate operator. With this measure, the radar device 1 can reduce the amount of calculation of the correlation matrix generator 20 and thereby calculate, in a simple manner, phase differences between the reception antennas of a reflection wave signal coming from the target TAR.

[Formula 10]

$$H(k_{Rx}, m) = \begin{bmatrix} CI^1(k_{Rx}, m) \\ CI^2(k_{Rx}, m) \\ \vdots \\ CI^4(k_{Rx}, m) \end{bmatrix} CI^1(k_{Rx}, m)^* \quad (10)$$

The distance estimator 21 receives the coherent integration values $CI^1(k_{Rx}, m), \ldots, CI^4(k_{Rx}, m)$ that are output from the coherent integrators of the antenna system processors 10, 10a, 10b, and 10c, respectively. The distance estimator 21 calculates an addition-of-squares value $RP(k_{Rx})$ of the received coherent integration values received from the antenna system processors 10, 10a, 10b, and 10c according to Equation (11):

[Formula 11]

$$RP(k_{Rx}) = \frac{1}{Nf} \sum_{m=1}^{Dp} \sum_{Nant=1}^{4} |CI^{Nant}(k_{Rx}, m)|^2 \quad (11)$$

In Equation (11), the addition-of-squares value $RP(k_{Rx})$ corresponds to a signal level, at each discrete time $k_{Rx}$, of the reflection wave signal coming from the target TAR. The distance estimator 21 selects a discrete time $k_{Rx}$ when the addition-of-squares value $RP(k_{Rx})$ is larger than an environment noise level by a prescribed value or more, and calculates a distance $Range(k_{Rx})$ to the target TAR on the basis of the selected discrete time $k_{Rx}$, according to Equation (12). In Equation (12), Co is the speed of light and $f_{RxBB}$ is the reception reference clock frequency. The distance estimator 21 outputs the calculated distance $Range(k_{Rx})$ to the target TAR to the incoming direction estimator 23.

[Equation 12]

$$Range(k_{Rx}) = Co \times (k_{Rx} - 1) \times \frac{1}{2f_{RxBB}} \quad (12)$$

The direction vector storage 22 is stored with complex responses of the array antenna in a case that an azimuth range and an elevation angle range for 5, estimation of a signal incoming direction from a target TAR by the radar device 1 installed at the position having the installation height $H_{ant}$ are divided two-dimensionally into prescribed NU and NV regions, respectively. In this embodiment, the complex responses of the array antenna are direction vectors $D(\theta_u, \phi_v)$ including azimuth components $\theta_u$ and elevation angle components $\phi_v$ in the case that the azimuth range and the elevation angle range for estimation of a signal incoming direction are divided two-dimensionally. Parameter u is an integer between 1 to NU, and parameter v is an integer between 1 to NV. NU and NV are prescribed numbers that are determined in accordance with a measurement area of the radar device 1.

The complex responses of the array antenna, which are measured in advance in an anechoic chamber, for example, include phase difference information that is calculated geometrically on the basis of the antenna element intervals of the array antenna and deviation information that includes the degrees of coupling and amplitude and phase errors between the antenna elements of the array antenna.

The incoming direction estimator 23 receives the correlation matrix $B(k_{Rx})$ that is output from the correlation matrix generator 20 and the distance $Range(k_{Rx})$ to the target TAR that is output from the distance estimator 21. The incoming direction estimator 23 estimates a signal incoming direction from the target TAR on the basis of the received correlation matrix $B(k_{Rx})$ and the distance $Range(k_{Rx})$ to the target TAR and the direction vectors $D(\theta_u, \phi_v)$ which are stored in the direction vector storage 22.

Figure 7:
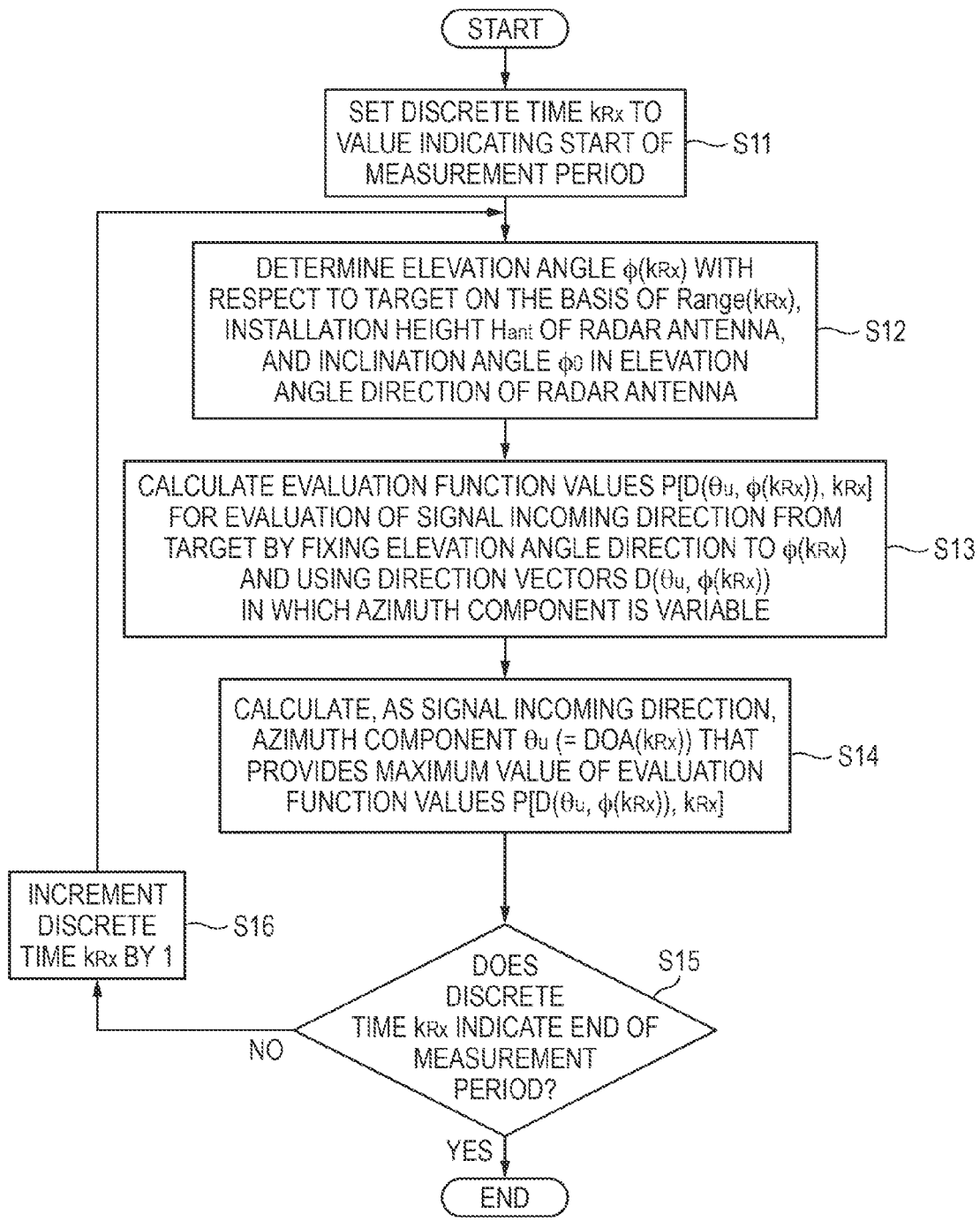
FIG. 7 is a flowchart for description of how an incoming direction estimator used in the first embodiment operates.

How the incoming direction estimator 23 operates will be described with reference to FIGS. 1 and 7. FIG. 7 is a flowchart for description of how the incoming direction estimator 23 used in the first embodiment operates.

Referring to FIG. 7, the incoming direction estimator 23 sets the discrete time $k_{Rx}$ to a value indicating the start of a measurement period of the radar device 1 (S11). The incoming direction estimator 23 calculates an elevation angle $\phi(k_{Rx})$ with respect to the target TAR on the basis of the distance $Range(k_{Rx})$ to the target TAR, the installation height $H_{ant}$ of the radar antenna RA, and the inclination angle $\phi_0$ in the elevation angle direction of the radar antenna RA (S12). An elevation angle $\phi(k_{Rx})$ with respect to the target TAR is calculated according to Equation (13):

[Formula 13]

$$\phi(k_{Rx}) = (\phi_b + \phi_0) - \frac{\pi}{2} \quad (13)$$

Parameter $\phi(k_{Rx})$ represents an elevation angle of the line connecting the radar antenna RA and the bottom of the target TAR with the direction of the inclination angle $\phi_0$ used as a reference. Parameter $\phi_b$ represents an angle formed by the line connecting the radar antenna RA and the bottom of the target TAR and is determined geometrically by the distance $Range(k_{Rx})$ to the target TAR and the installation height $H_{ant}$. Parameter $\phi_b$, is calculated according to Equation (14). Relationships $\phi_b > 0$ and $\phi_0 \leq 0$ hold.

[Formula 14]

$$\phi_b = \cos^{-1}\left[\frac{H_{ant}}{Range(k_{Rx})}\right] \quad (14)$$

The incoming direction estimator 23 fixes the elevation angle component of the direction vector $D(\theta_u, \phi_v)$ stored in the direction vector storage 22 to the elevation angle $\phi(k_{Rx})$ with respect to the target TAR that was calculated at step S12. The incoming direction estimator 23 calculates evaluation function values $P[D(\theta_u, \phi(k_{Rx})), k_{Rx}]$ for evaluation of a signal incoming direction from the target TAR according to Equation (15) using the direction vectors $D(\theta_u, \phi(k_{Rx}))$ in which the azimuth component is variable (step S13).

[Formula 15]

$$P[D(\theta_u, \phi(k_{Rx})), k_{Rx}] = D(\theta_u, \phi(k_{Rx}))^H B(k_{Rx}) D(\theta_u, \phi(k_{Rx})) \quad (15)$$

Various kinds of evaluation function values $P[D(\phi_u, \phi(k_{Rx})), k_{Rx}]$ are known that correspond to respective incoming direction estimation algorithms. Each of the embodiments including this embodiment employs the evaluation function values of a beam former method using an array antenna that is disclosed in the following Referential non-patent document 1, for example. In Equation (15), the superscript H is the Hermite operator. Alternatively, a Capon method or a MUSIC method may be used.

(Referential non-patent document 1) James A. Cadzow, "Direction of Arrival Estimation Using Signal Subspace Modeling," Aerospace and Electronic Systems, IEEE Transactions on Vol. 28, Issue 1, pp. 64-79 (1992).

The incoming direction estimator 23 calculates, according to Equation (16), an azimuth component $\theta_u$ that provides a maximum value of the evaluation function values $P[D(\theta_u, \phi(k_{Rx})), k_{Rx}]$ calculated at step S13. The incoming direction estimator 23 judges that the azimuth component $\theta_u$ that provides the maximum value of the evaluation function values $P[D(\theta_u, \phi(k_{Rx})), k_{Rx}]$ is a signal incoming direction DOA(k) from the target TAR (S14). In Equation (16), parameter arg max P(x) is an operator of outputting a value with which the function P(x) has a maximum value in its domain.

[Formula 16]

$$DOA(k_{Rx}) = \underset{\theta_u}{\arg\max} P[D(\theta_u, \phi(k_{Rx})), k_{Rx}] \qquad (16)$$

The incoming direction estimator 23 finishes the process if the discrete time $k_{Rx}$ indicates the end of the measurement period of the radar device 1 (S15: yes). On the other hand, if the discrete time $k_{Rx}$ does not indicate the end of the measurement period of the radar device 1 (S15: no), the incoming direction estimator 23 increments the discrete time $k_{Rx}$, (S16) and executes steps S12-S14 again with the next discrete time $k_{Rx}$.

As described above, in the radar device 1 according to the embodiment, a distance Range($k_{Rx}$) to a target TAR, which can be measured relatively accurately compared with calculation of an azimuth component, is calculated first and an elevation angle component of a direction vector $D(\theta_u, \phi_v)$ is determined (fixed). In the radar device 1, evaluation functions $P[D(\theta_u, \phi(k_{Rx})), k_{Rx}]$ for evaluation of a signal incoming direction are then calculated using the direction vectors $D(\theta_u, \phi(k_{Rx}))$ in which the elevation angle component is fixed and the azimuth component is variable, and an azimuth component that provides a maximum value of the evaluation functions is employed as a signal incoming direction from the target TAR.

In the radar device 1 which operates in the above-described manner, the amount of calculations for estimating an incoming direction of a reflection wave signal coming from the target can be reduced. And the accuracy of estimation of a signal incoming direction can be increased because a signal incoming direction is estimated using information of amplitude and phase deviations that depend on the azimuth $\theta$ direction and the elevation angle $\phi$ direction and occur between the reception antenna elements.

Although in this embodiment the radar transmitter Tx is provided with the single transmission antenna Tx-ant, the radar transmitter Tx may be provided with an array antenna having plural transmission antennas like the radar receiver Rx is. In this case, the radar transmitter Tx can vary the directivity of a radar transmission signal using the array antenna.

The incoming direction estimator 23 calculates evaluation function values $P[D(\theta_u, \phi(k_{Rx})), k_{Rx}]$ on the basis of a prescribed elevation angle component (or azimuth component) range, determined in accordance with directivity of a radar transmission signal, of a direction vector $D(\theta, \phi)$, and employs, as a signal incoming direction, an azimuth component of a direction vector that provides a maximum value of the evaluation function values. With this measure, the amount of calculation of the radar receiver 3 of the radar device 1 can be reduced further. That the radar receiver Tx may be provided with an array antenna having plural transmission antennas like the radar receiver Rx is likewise applicable to each of the following embodiments.

(Modification of Embodiment 1)

Figure 15:
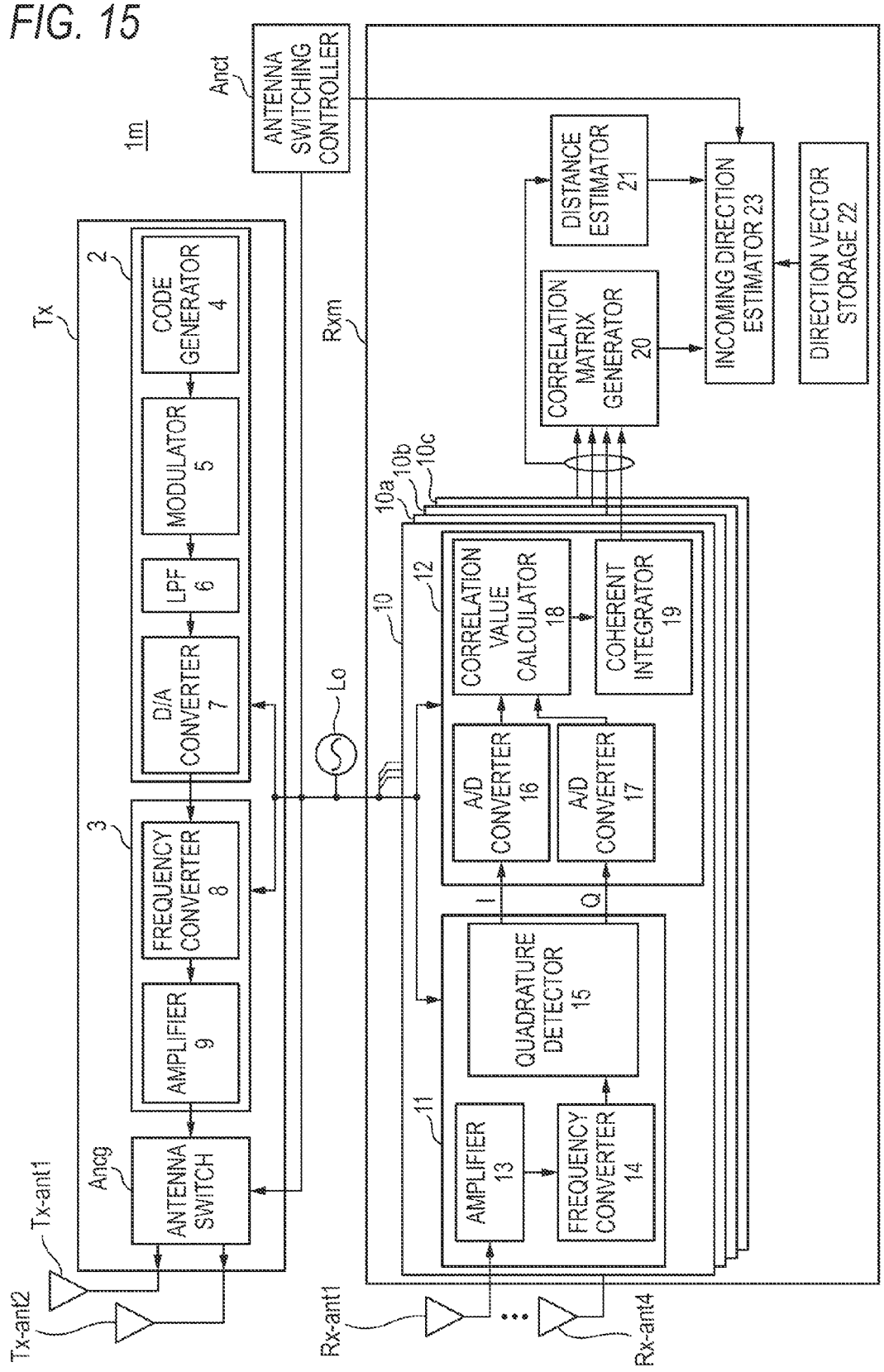
FIG. 15 is a block diagram showing the internal configuration of a radar device according to a modification of the first embodiment in detail.

Although in the first embodiment the radar transmitter Tx is provided with the single transmission antenna Tx-ant, a modification is possible in which the radar transmitter Tx is provided with an array antenna having plural transmission antennas and one of the transmission antennas is selected. FIG. 15 is a block diagram showing the internal configuration of a radar device 1m according to a modification of the first embodiment in detail.

The radar transmitter Tx of the radar device 1m shown in FIG. 15 is different in configuration from the radar transmitter Tx shown in FIG. 3 in that two transmission antennas Tx-ant1 and Tx-ant2 are provided and an antenna switch Ancg and an antenna switching controller Anct are added. The antenna switching controller Anct outputs a switching control signal for selecting one of the plural transmission antennas Tx-ant1 and Tx-ant2.

Figure 16:
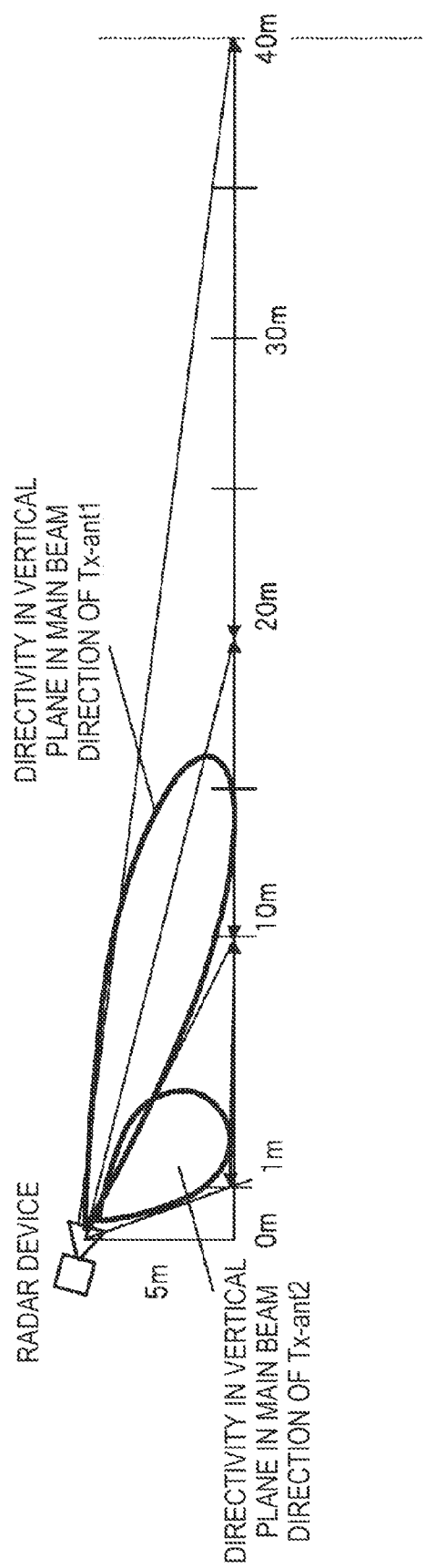
FIG. 16 is an explanatory diagram showing a depression angle in a vertical plane in a main beam direction of each antenna of a radar device according to a modification of the first embodiment.

The antenna switching controller Anct selects an antenna for transmitting a radar transmission signal on the basis of the switching control signal supplied from the antenna switching controller Anct. As shown in FIG. 16, the transmission antennas Tx-ant1 and Tx-ant2 are different from each other in the depression angle in a vertical plane in a main beam direction of a radar transmission signal, whereby the transmission antennas Tx-ant1 and Tx-ant2 have different distance detection ranges. The transmission antennas Tx-ant1 and Tx-ant2 may be given different beam widths in a vertical plane.

The incoming direction estimator 23 calculates evaluation function values $P[D(\theta_u, \phi(k_{Rx})), k_{Rx}]$ on the basis of an elevation angle component range of a direction vector $D(\theta_u, \phi_v)$ corresponding to one of different distance ranges that corresponds to one of the transmission antennas Tx-ant1 and Tx-ant2 that is selected as an antenna for transmitting a radar transmission signal on the basis of a switching control signal supplied from the antenna switching controller Anct, and employs, as a signal incoming direction, an azimuth component of a direction vector that provides a maximum value of the evaluation function values. As a result, the amount of calculation of a radar receiver Rxm of the radar device 1m can be reduced further.

That the radar receiver Tx may be provided with an array antenna having plural transmission antennas like the radar receiver Rxm is likewise applicable to each of the following embodiments.

(Embodiment 2)

Figure 8:
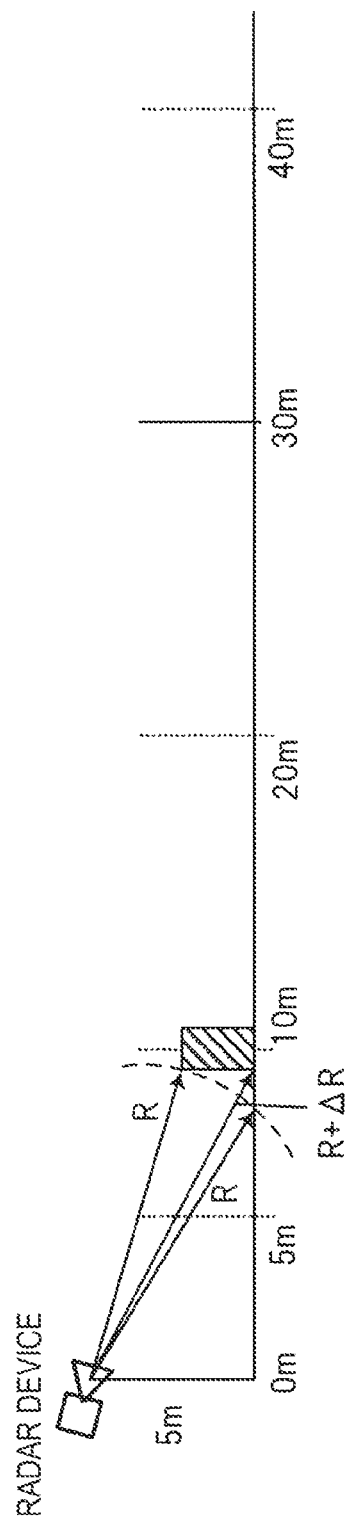
FIG. 8 is for description of a probability that the elevation angle component of the direction vector varies depending on the height of a short-range target to cause reduction of the accuracy of estimation of a signal incoming direction.

FIG. 8 is for description of a probability that the elevation angle component of the direction vector varies depending on the height of a short-range target TAR to cause reduction of the accuracy of estimation of a signal incoming direction. If a target TAR that is relatively dose to a radar device is tall (when measured from the ground), it is necessary to consider a difference between distances to the target TAR calculated using a reflection wave signal reflected from the top of the target TAR and a reflection wave signal reflected from the bottom of the target TAR.

Therefore, the radar device is prone to suffer a distance estimation error. Since a signal incoming direction is estimated without correctly using information of amplitude and phase deviations that depend on the elevation angle $\phi$ direction and occur between the reception antenna elements, the accuracy of estimation of a signal incoming direction from the target TAR is lowered.

Figure 9:
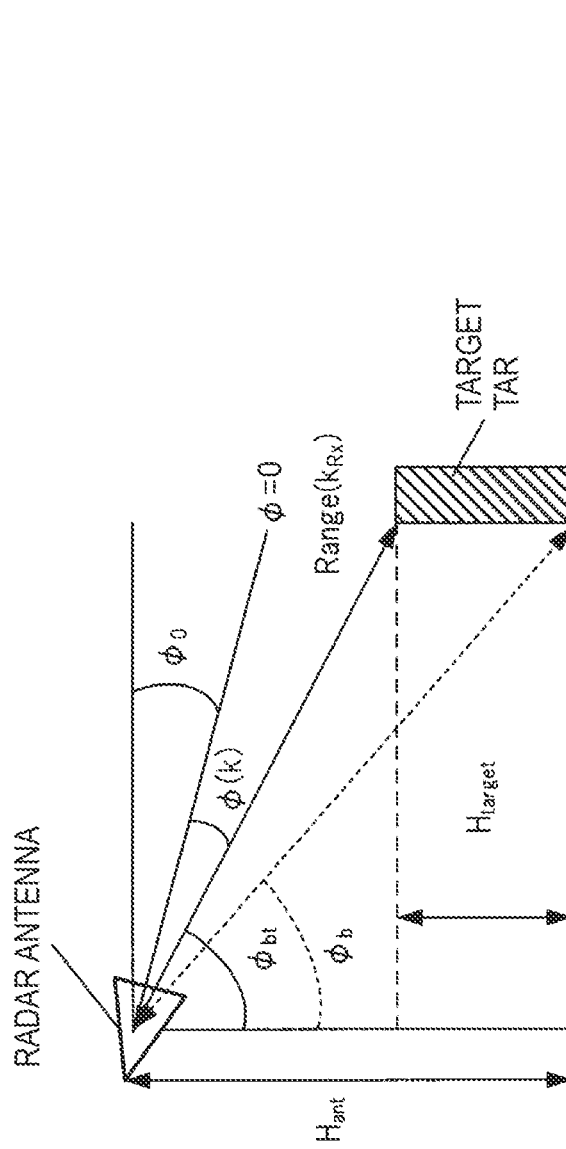
FIG. 9 is an explanatory diagram showing a straight line extending in the direction of an inclination angle $\phi_0$ of a radar antenna of a radar device according to a second embodiment and an elevation angle $\phi(k_{Rx})$ with respect to a target.

In this modification, the incoming direction estimator calculates a range of the elevation angle component $\phi(k_{Rx})$ with respect to the target TAR using a distance Range($k_{Rx}$) to the target TAR calculated by the distance estimator and taking the height $H_{target}$ of the target TAR from the ground into consideration (see FIG. 9). FIG. 9 is an explanatory diagram showing a straight line extending in the direction of an inclination angle $\phi_0$ of a radar antenna of a radar device according to the second embodiment and an elevation angle $\phi(k_{Rx})$ with respect to the target.

The configuration of the radar device according to this embodiment is the same as the radar device 1 according to the first embodiment and hence will not be described. Differences in operation from the radar device 1 according to the first embodiment will be described. In the following description, reference symbols of individual units of the radar device 1 according to the first embodiment will be used for the sake of convenience.

Figure 10:
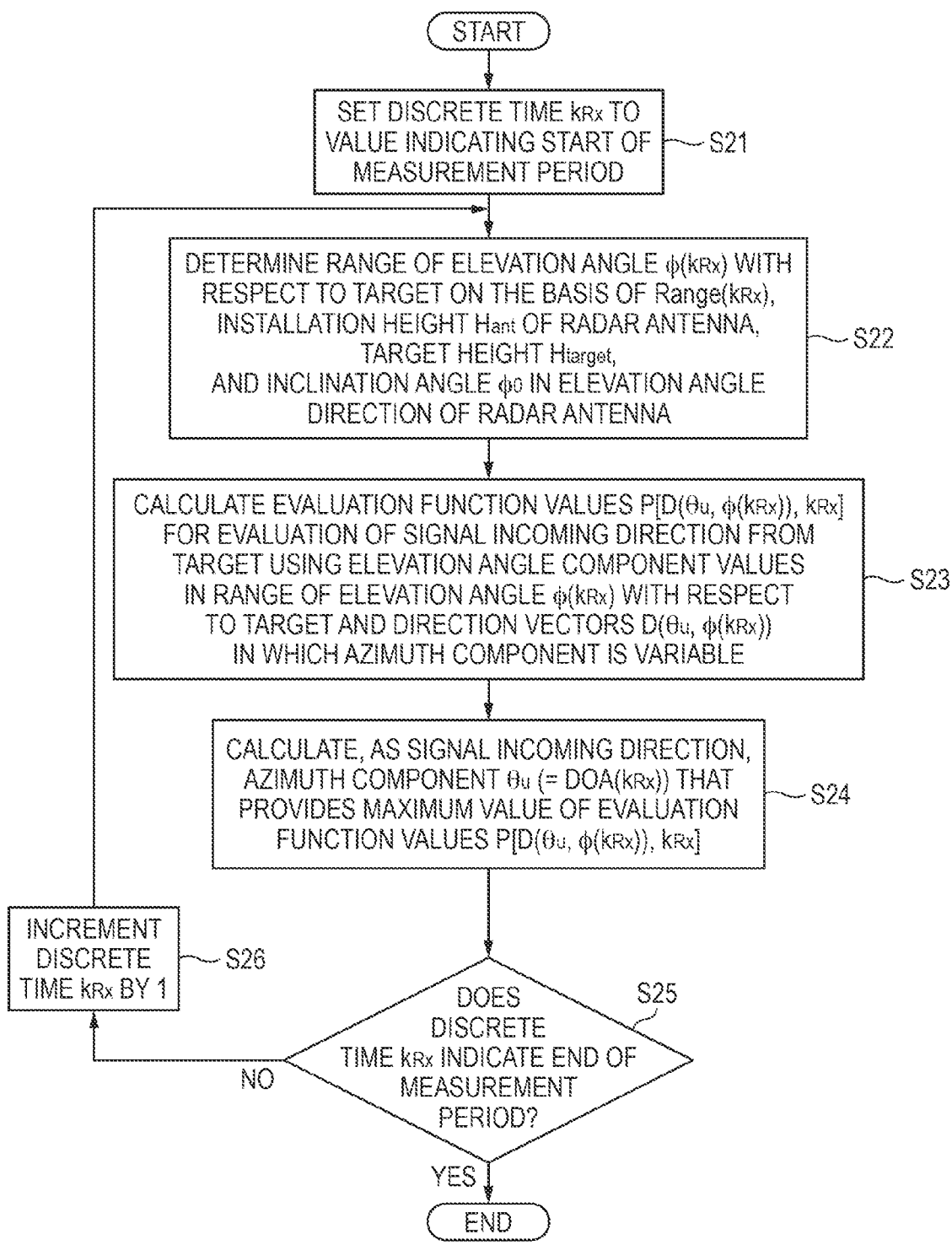
FIG. 10 is a flowchart for description of how an incoming direction estimator used in the second embodiment operates.

How the incoming direction estimator 23 used in this embodiment operates will be described with reference to FIGS. 9 and 10. FIG. 10 is a flowchart showing how the incoming direction estimator 23 used in the second embodiment operates.

Referring to FIG. 10, the incoming direction estimator 23 sets the discrete time $k_{Rx}$ to a value indicating the start of a measurement period of the radar device 1 (S21). The incoming direction estimator 23 calculates an elevation angle $\phi(k_{Rx})$ range with respect to the target TAR on the basis of a distance Range($k_{Rx}$) to the target TAR, the installation height $H_{ant}$ of the radar antenna RA, an expected height $H_{target}$ of the target TAR from the ground, and the inclination angle $\phi_0$ in the elevation angle direction of the radar antenna RA (S22). The elevation angle $\phi(k_{Rx})$ with respect to the target TAR is in a range of Equation (17):

[Formula 17]

$$\phi(k_{Rx}) = \left[(\phi_{bt} + \phi_0) - \frac{\pi}{2}, (\phi_b + \phi_0) - \frac{\pi}{2}\right] \quad (17)$$

Parameter $\phi(k_{Rx})$ represents a range from an elevation angle of the line connecting the radar antenna RA and the bottom of the target TAR with the direction of the inclination angle $\phi_0$ used as a reference to an elevation angle of the line connecting the radar antenna RA and the top of the target TAR with the direction of the inclination angle $\phi_0$ used as a reference. Parameter $\phi_b$ represents an elevation angle formed by the line connecting the radar antenna RA and the bottom of the target TAR and is determined geometrically by the distance Range($k_{Rx}$) to the target TAR and the installation height $H_{ant}$. Parameter $\phi_b$ is calculated according to Equation (14).

Parameter $\phi_{bt}$ represents an elevation angle formed by the line connecting the radar antenna RA and the bottom of the target TAR and is determined geometrically by the distance Range($k_{Rx}$) to the target TAR, the installation height $H_{ant}$, and the height $H_{target}$ of the target TAR from the ground. Parameter $\phi_b$ is calculated according to Equation (14).

[Formula 18]

$$\phi_{bt} = \cos^{-1}\left[\frac{(H_{ant} - H_{target})}{\text{Range}(k_{Rx})}\right] \quad (18)$$

The incoming direction estimator 23 varies the elevation angle component of the direction vector $D(\theta_u, \phi_v)$ stored in the direction vector storage 22 in the range of the elevation angle $\phi(k_{Rx})$ with respect to the target TAR that was calculated at step S22. The incoming direction estimator 23 calculates evaluation function values $P[D(\theta_u, \phi(k_{Rx})), k_{Rx}]$ for evaluation of a signal incoming direction from the target TAR according to Equation (15) using the direction vectors $D(\theta_u, \phi(k_{Rx}))$ in which the elevation angle component (variable in thus-set range) and the azimuth component are variable (step S23). The evaluation function values $P[D(\theta_u, \phi(k_{Rx})), k_{Rx}]$ are not described here because they are the same as in the first embodiment.

The incoming direction estimator 23 calculates, according to Equation (16), an azimuth component $\theta_u$ that provides a maximum value of the evaluation function values $P[D(\theta_u, \phi(k_{Rx})), k_{Rx}]$ calculated at step S23. The incoming direction estimator 23 judges that the azimuth component $\theta_u$ that provides the maximum value of the evaluation function values $P[D(\theta_u, \phi(k_{Rx})), k_{Rx}]$ is a signal incoming direction DOA($k_{Rx}$) from the target TAR (S24).

The incoming direction estimator 23 finishes the process if the discrete time $k_{Rx}$ indicates the end of the measurement period of the radar device 1 (S25: yes). On the other hand, if the discrete time $k_{Rx}$ does not indicate the end of the measurement period of the radar device 1 (S25: no), the incoming direction estimator 23 increments the discrete time $k_{Rx}$ (S26) and executes steps S22-S24 again with the next discrete time $k_{Rx}$.

As described above, in the radar device 1 according to the embodiment, a range of the elevation angle component $\phi(k_{Rx})$ with respect to the target TAR is calculated by using a distance Range($k_{Rx}$) to the target TAR calculated by the distance estimator and taking an expected height $H_{target}$ of the target TAR from the ground into consideration. In the radar device 1, a signal incoming direction from the target TAR is estimated in the same manner as in the first embodiment using the range of elevation angle component $\phi(k_{Rx})$ with respect to the target TAR.

Operating the above-described manner, the radar device 1 according to this embodiment provides, in addition to the advantages of the first embodiment, an advantage that a signal incoming direction from a target TAR can be estimated taking the $H_{target}$ of the target TAR from the ground into consideration. That is, in the radar device 1 according to this embodiment, the accuracy of estimation of a signal incoming direction from a target TAR can be made higher than in the radar device 1 according to the first embodiment even in the case where the target TAR is in a short range, because an signal incoming direction is estimated using, correctly, information of amplitude and phase deviations that depend on the elevation angle $\phi$ direction and occur between the reception antenna elements, the accuracy of estimation of a signal incoming direction from the target TAR is lowered.

Alternatively, the incoming direction estimator 23 may calculate a maximum value of evaluation function values by varying the elevation angle component of the evaluation function value, that is, the elevation angle $\phi(k_{Rx})$ with respect to a target TAR, on the basis of a maximum value, expected in advance, of the $H_{target}$ of the target TAR from the ground. This allows the incoming direction estimator 23 to use a range, expected in advance, of the $H_{target}$ of a target TAR from the ground, whereby the amount of calculations of evaluation function values can be reduced further.

Figure 11:
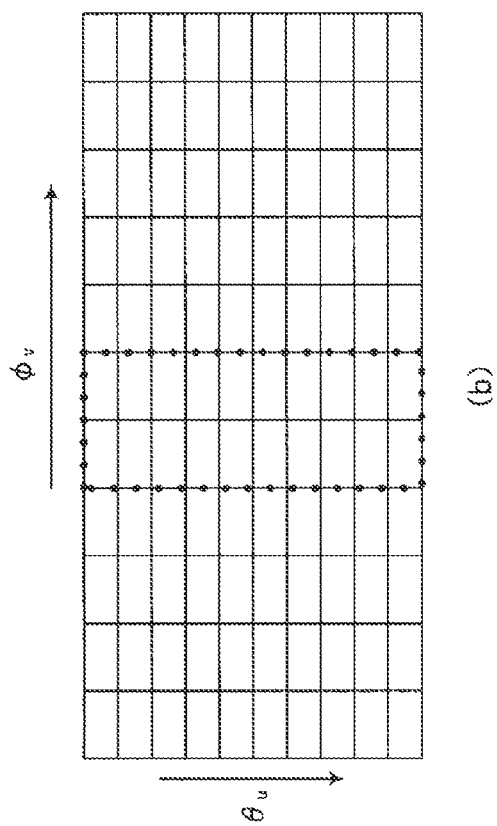
FIG. 11 is explanatory diagrams showing how an elevation angle component range of evaluation function values is determined in accordance with a distance range.
Figure 11:
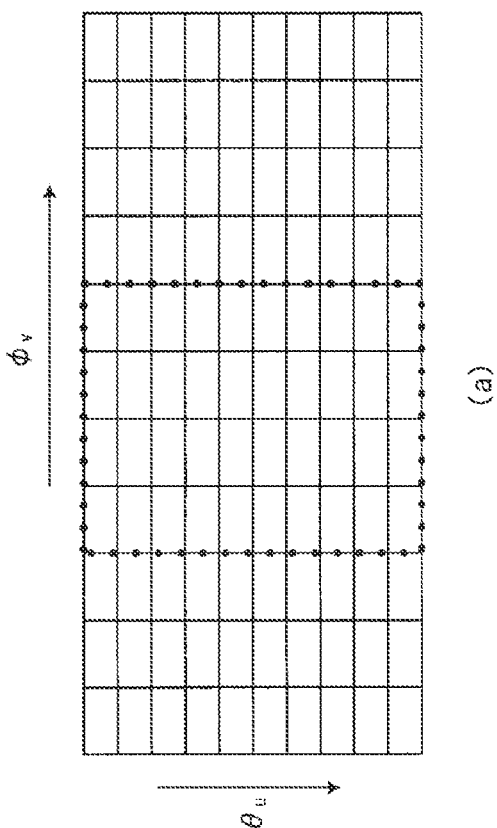

As a further alternative, the incoming direction estimator 23 may calculate a maximum value of evaluation function values by varying the elevation angle $\phi(k_{Rx})$ with respect to a target TAR in accordance with its distance range from the radar antenna RA (see FIG. 11). FIG. 11 is explanatory diagrams showing how an elevation angle component range of evaluation function values is determined in accordance with a distance range. FIG. 11(a) is for a target in a short range and FIG. 11(b) is for a target located at a distant place.

In the example of FIG. 11(a), since the target TAR is close to the radar antenna RA, the incoming direction estimator 23 sets the range of the elevation angle component $\phi(k_{Rx})$ with respect to the target TAR relatively wider than in the case of a target TAR that is distant from the radar antenna RA. In the example of FIG. 11(b), since the target TAR is distant from the radar antenna RA, the incoming direction estimator 23 sets the range of the elevation angle component $\phi(k_{Rx})$ with respect to the target TAR relatively narrower than in the case of a target TAR that is close to the radar antenna RA.

Operating in the above-described manner, the incoming direction estimator 23 can vary the range of the elevation angle component $\phi(k_{Rx})$ with respect to a target TAR in accordance with its distance Range($k_{Rx}$) from the radar antenna RA, whereby the amount of calculations of evaluation function values can be reduced further. The incoming direction estimator 23 may judge that a target TAR is located at a distant place if the distance from the radar antenna RA to the target TAR is longer than a prescribed threshold value, and judge that a target TAR is located in a short range if the distance is shorter than the prescribed threshold value.

(Embodiment 3)

In the first and second embodiments, the direction vectors $D(\theta_u, \phi_v)$ which are stored in the direction vector storage 22 are ones that were obtained in advance through a measurement in an anechoic chamber and a calculation and hence have fixed values. In this embodiment, switching is made between a measurement mode (operation state) in which a distance and a signal incoming direction are estimated and a calibration mode (operation state) in which direction vectors are measured for update.

Figure 12:
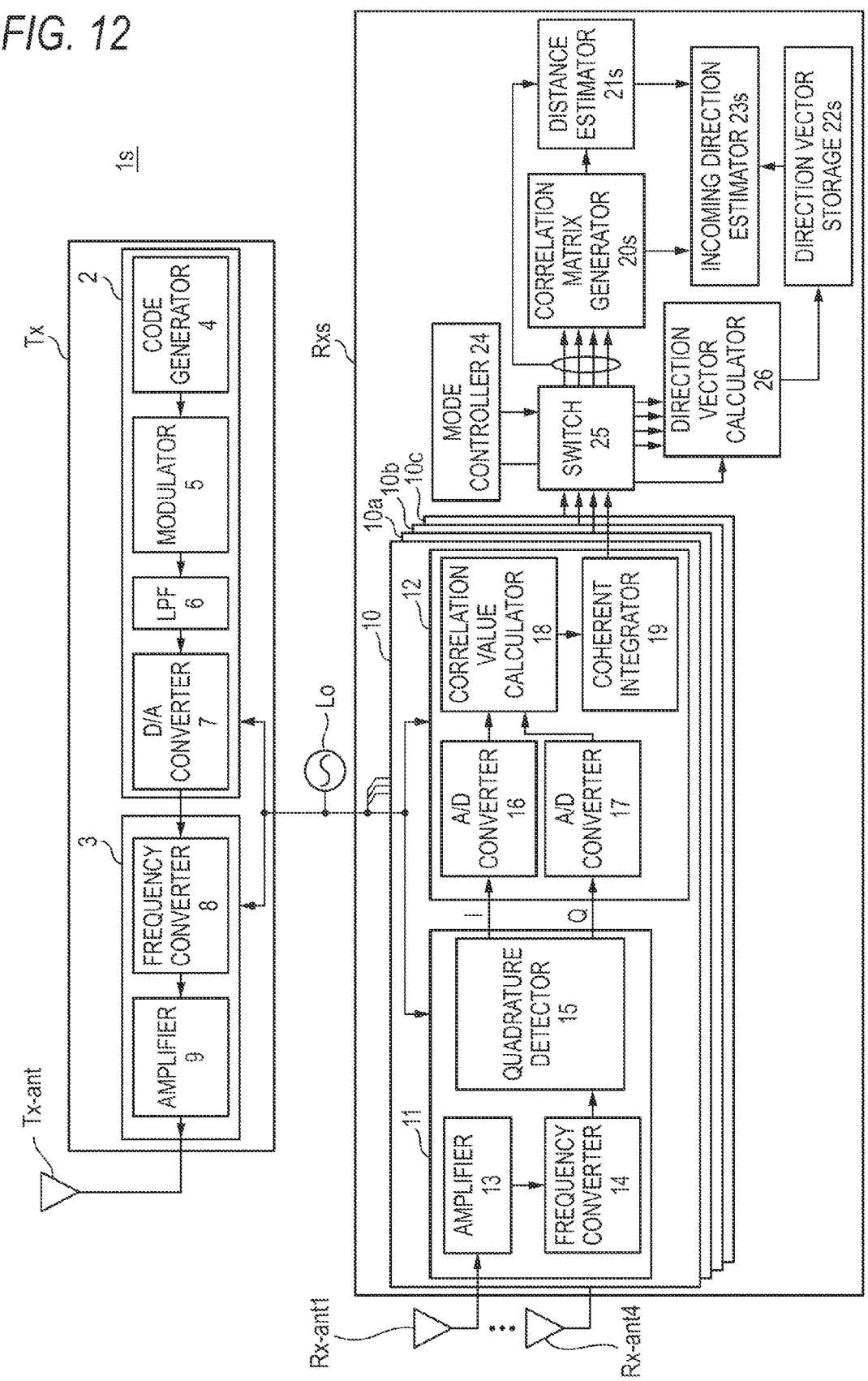
FIG. 12 is a block diagram showing the internal configuration of a radar device according to a third embodiment in detail.

FIG. 12 is a block diagram showing the internal configuration of a radar device 1s according to the third embodiment in detail. Units of the radar device 1s according to the third embodiment having the same ones in the radar device 1 according to the first embodiment will be given the same reference symbols as the latter and descriptions therefor will be omitted. Differences in operation from the radar device 1 according to the first embodiment will be described.

Like the radar device 1 according to the first or second embodiment, the radar device 1s installed at a position having a prescribed height $H_{ant}$ from the ground. As shown in FIG. 12, the radar device 1s is configured so as to include a reference signal oscillator Lo, a radar transmitter Tx, and a radar receiver Rxs. The configuration of the radar transmitter Tx is the same as that used in the first or second embodiment and hence will not be described. The reference signal oscillator Lo is connected to the radar transmitter Tx and the radar receiver Rxs and supplies a common signal to them, whereby pieces of processing of the radar transmitter Tx and the radar receiver Rxs are synchronized with each other.

The radar receiver Rxs is configured so as to have four antenna system processors 10, 10a, 10b, and 10c, a mode controller 24, a switch 25, a direction vector calculator 26, a correlation matrix generator 20s, a distance estimator 21s, a direction vector storage 22s, and an incoming direction estimator 23s. Although the radar receiver Rxs shown in FIG. 12 has the four antenna system processors, the number of antenna system processors is not limited to four and may be two or more.

The mode controller 24 outputs, to the switch, a switching signal indicating a mode to which switching should be made, that is, the measurement mode for estimating a distance to a target TAR and a signal incoming direction from the target TAR or the calibration mode for measuring direction vectors for update. In the calibration mode, a target TAR for calibration is disposed at a point Z of a known position (distance: $R_{cal}$) and a direction vector $D_{cal}(\theta_{cal}, \phi_{cal})$ having an azimuth component $\theta_{cal}$ and an elevation angle component $\phi_{cal}$ of the point Z is measured. Furthermore, in the calibration mode, the direction vector $D_{cal}(\theta_u, \phi_v)$ that is already stored in the direction vector storage 22 and has the azimuth component $\theta_{cal}$ and the elevation angle component $\phi_{cal}$ of the point Z is updated to the measured direction vector $D_{cal}(\theta_{cal}, \phi_{cal})$.

In the calibration mode, the mode controller 24 outputs, to the direction vector calculator 26, a control signal for causing measurement of a direction vector $D_{cal}(\theta_{cal}, \phi_{cal})$ having the azimuth component $\theta_{cal}$ and the elevation angle component $\phi_{cal}$ of the point Z of the known position (distance: $R_{cal}$) for the target TAR for calibration disposed at the point Z. The control signal for causing measurement of a direction vector $D_{cal}(\theta_{cal}, \phi_{cal})$ contains pieces of information that are a discrete time $k_{cal}$, the azimuth component $\theta_{cal}$, and the elevation angle component $\phi_{cal}$. The mode controller 24 outputs, to the direction vector calculator 26, a control signal for causing the direction vector storage 22s to update the current direction vector $D_{cal}(\theta_{cal}, \phi_1)$ stored in the direction vector storage 22s to a direction vector $D_{cal}(\theta_{cal}, \phi_{cal})$ measured for the point Z of the known position (distance: $R_{cal}$).

In response to a control signal that is output from the mode controller 24, the switch 25 switches the output destination of coherent integration values supplied from the respective antenna system processors 10, 10a, 10b, and 10c to the correlation matrix generator 20s or the direction vector calculator 26s. More specifically, in the measurement mode, the switch 25 outputs coherent integration values supplied from the respective antenna system processors 10, 10a, 10b, and 10c to the correlation matrix generator 20s. In the calibration mode, the switch outputs coherent integration values supplied from the respective antenna system processors 10, 10a, 10b, and 10c to the direction vector calculator 26.

The direction vector calculator 26 calculates, as phase different information for a reference antenna for the discrete time $k_{cal}$, the azimuth component $\theta_{cal}$, and the elevation angle component $\phi_{cal}$, a direction vector $D_{cal}(\theta_{cal}, \phi_{cal})$ for the target TAR for calibration disposed at the point Z (distance: $R_{cal}$) on the basis of an output signal that is output from the mode controller 24 (see Equation (19)). The direction vector calculator 26 stops its operation in the measurement mode.

[Formula 19]

$$D(\theta_{cal}, \phi_{cal}) = \frac{1}{N_p N cal} \sum_{m=1}^{Ncal} \begin{bmatrix} CI^1(k_{cal}, m) \\ CI^2(k_{cal}, m) \\ \vdots \\ CI^4(k_{cal}, m) \end{bmatrix} CI^{Ra*}(k_{cal}, m) \quad (19)$$

In Equation (19), parameter Ra is a reference antenna number indicating one of the antennas Rx-ant1 to Rx-ant4. Parameter Ncal is the number of transmission cycles (a period Ncal×Tr) in which the calibration mode is maintained. Furthermore, the asterisk "*" (superscript) in Equation (19) is the complex conjugate operator.

The direction vector calculator 26 updates the direction vector $D_{cal}(\theta_{cal}, \phi_{cal})$ having the azimuth component $\theta_{cal}$ and the elevation angle component $\phi_{cal}$ and stored in the direction vector storage 22s to the direction vector $D_{cal}(\theta_{cal}, \phi_{cal})$ calculated for the discrete time $k_{cal}$ on the basis of an output signal that is output from the mode controller 24. The mode controller 24 causes the switch 25 and the direction vector calculator 26 to perform calibration, that is, update of the direction vectors, in a measurement area of the radar device 1s using the target TAR for calibration disposed at the point Z of the known position (distance: $R_{cal}$) while varying the azimuth component $\theta_{cal}$ and the elevation angle component $\phi_{cal}$ (i.e., point Z) at prescribed intervals.

As described above, in the measurement mode, the radar device is according to this embodiment operates in the same manner as the radar device 1 according to the first or second embodiment. In the calibration mode, the radar device 1s performs calibration in the measurement area of the radar device 1s using the target TAR for calibration disposed at the point Z of the known position (distance: $R_{cal}$) while varying the azimuth component $\theta_{cal}$ and the elevation angle component $\phi_{cal}$ (i.e., point Z) at prescribed intervals.

Operating in the above-described manner, the radar device 1s provides, in addition to the advantages of the first or second embodiment, an advantage that switching can be made easily between the measurement mode and the calibration mode under an installation environment of the radar device 1s. Furthermore, in the calibration mode, the radar device 1s can update the direction vectors stored in the direction vector storage 22s so as to correspond to the azimuth components and elevation angle components. Therefore, the radar device 1s can correct the direction vectors even if variations with age have occurred in the deviations (in amplitude and phase) between the plural reception antennas of the array antenna, whereby the radar device 1s can be prevented from deteriorating with age in the accuracy of estimation of a signal incoming direction.

(Modification of Embodiment 3)

Figure 17:
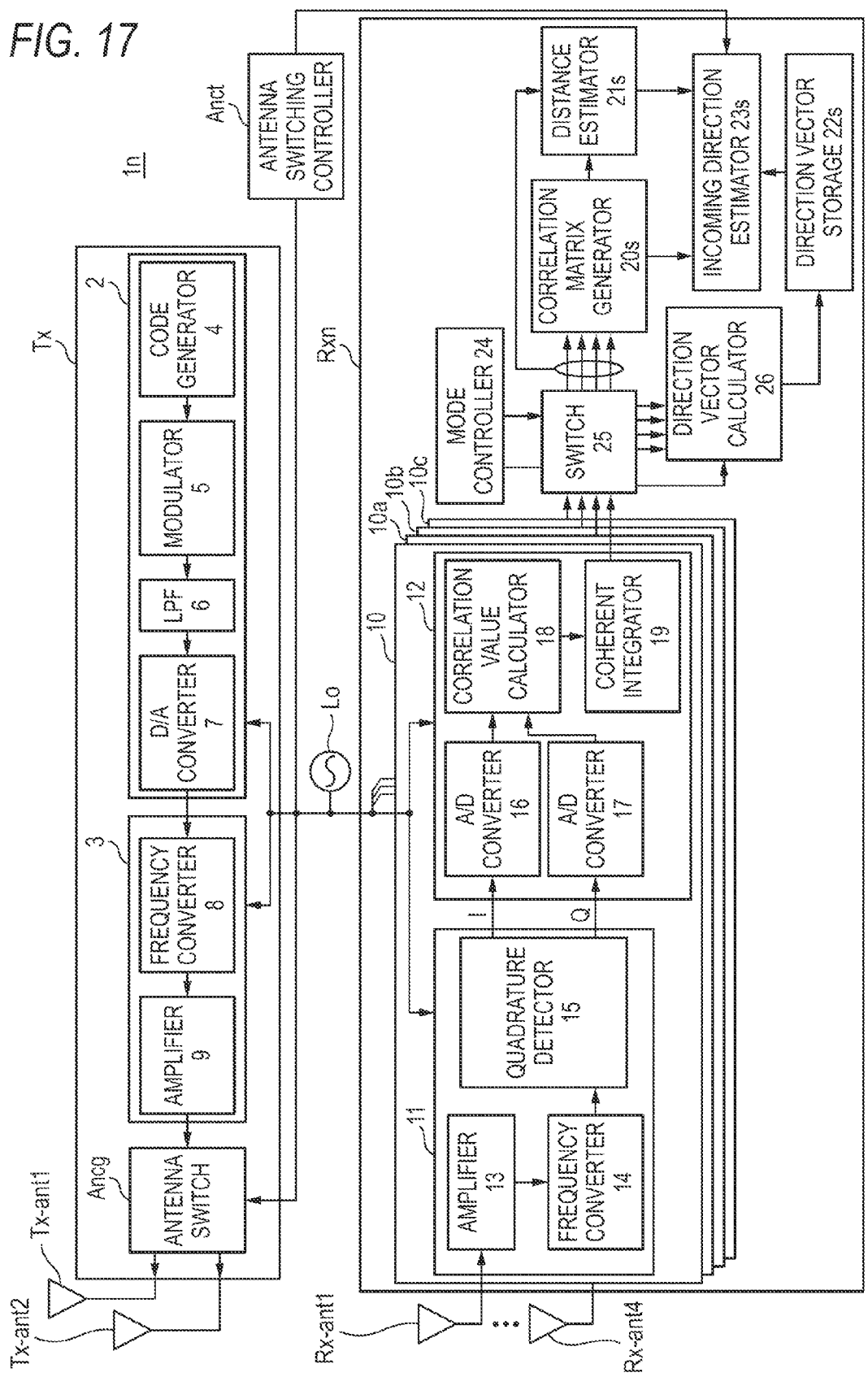
FIG. 17 is a block diagram showing the internal configuration of a radar device according to a modification of the third embodiment in detail.

Although in the third embodiment the radar transmitter Tx is provided with the single transmission antenna Tx-ant, a modification is possible in which the radar transmitter Tx is provided with plural transmission antennas and one of the transmission antennas is selected. FIG. 17 is a block diagram showing the internal configuration of a radar device 1n according to a modification of the third embodiment in detail.

The radar transmitter Tx of the radar device 1n shown in FIG. 17 is different in configuration from the radar transmitter Tx shown in FIG. 12 in that two transmission antennas Tx-ant1 and Tx-ant2 are provided and an antenna switch Ancg and an antenna switching controller Anct are added.

The antenna switching controller Anct outputs a switching control signal for selecting one of the plural transmission antennas Tx-ant1 and Tx-ant2.

The antenna switching controller Anct selects an antenna for transmitting a radar transmission signal on the basis of the switching control signal supplied from the antenna switching controller Anct. As shown in FIG. 16, the transmission antennas Tx-ant1 and Tx-ant2 are different from each other in the depression angle in a vertical plane in a main beam direction of a radar transmission signal, whereby the transmission antennas Tx-ant1 and Tx-ant2 have different distance detection ranges. The transmission antennas Tx-ant1 and Tx-ant2 may be given different beam widths in a vertical plane.

The incoming direction estimator 23s calculates evaluation function values $P[D(\theta_u, \phi(k_{Rx})), k_{Rx}]$ on the basis of an elevation angle component range of the direction vectors $D(\theta_u, \phi_v)$ corresponding to one of different distance ranges that corresponds to one of the transmission antennas Tx-ant1 and Tx-ant2 that is selected as an antenna for transmitting a radar transmission signal on the basis of a switching control signal supplied from the antenna switching controller Anct, and employs, as a signal incoming direction, an azimuth component of a direction vector that provides a maximum value of the evaluation function values. As a result, the amount of calculation of a radar receiver Rxn of the radar device 1n can be reduced further.

Although the various embodiments have been described above with reference to the drawings, it goes without saying that this disclosure is not limited to those examples. It is apparent that those skilled in the art would conceive various changes or modifications within the confines of the claims. And such changes or modifications should naturally be construed as being included in the technical scope of the disclosure.

The present application is based on Japanese Patent Application No. 2011-265020 filed on Dec. 2, 2011, the disclosure of which is incorporated herein by reference.

INDUSTRIAL APPLICABILITY

This disclosure is useful when applied to a radar device which is high in the accuracy of estimation of a direction of each target in a case that plural targets exist in a range of distance resolution and reflection wave signals coming from the respective targets have similar Doppler frequencies.

DESCRIPTION OF SYMBOLS 1, 1s: Radar device
2, 2s: Transmission signal generator
3: RF transmitter
4: Code generator
5, 5r: Modulator
6, 6r: LPF
7: D/A converter
8, 14: Frequency converter
9, 13: Amplifier
10, 10a, 10b, 10c: Antenna system processor
11: RF receiver
12: Signal processor
15: Quadrature detector
16, 17: ND converter
18: Correlation value calculator
19: Coherent integrator
20, 20s: Correlation matrix generator
21, 21s: Distance estimator 22, 22s: Direction vector storage
23, 23s: Incoming direction estimator
24: Mode controller
25: Switch
26: Direction vector calculator
CM: Transmission code storage
CM3: Transmission code controller
Rx, Rx3: Radar receiver
Tx: Radar transmitter

The invention claimed is:

1. A radar device installed at a position having a prescribed height from the ground, comprising:
 a radar transmitter that converts a transmission code into a radio-frequency radar transmission signal and transmits the radar transmission signal from a transmission antenna which is inclined so as to extend in a prescribed direction which is defined by a line connecting the position having the prescribed height and the ground; and
 a radar receiver that estimates a signal incoming direction from a target using incoming direction vectors, having fixed azimuth components and variable elevation angle components, of the target calculated on the basis of outputs of plural antenna system processors which receive a reflection wave signal produced by reflection of the radar transmission signal by the target.

2. The radar device according to claim 1, wherein the direction vectors depend on an azimuth direction and an elevation angle direction and include deviation information indicating amplitude and phase deviations to occur between the plural antenna system processors.

3. The radar device according to claim 1, wherein each of the plural antenna system processors comprises:
 a correlation calculator that calculates a correlation value between a reception signal and the transmission code; and
 a coherent integrator that performs coherent integration using a prescribed coherent integration number.

4. The radar device according to claim 3, wherein each of the plural antenna system processors further comprises:
 a reception antenna that receives the reflection wave signal;
 a RF receiver that converts the received reception signal into a baseband signal; and
 an A/D converter that converts the baseband-converted reception signal into digital data.

5. The radar device according to claim 1, wherein the distance estimator calculates an addition-of-squares value of coherent integration outputs of the plural respective antenna system processors, and estimates a distance to the target on the basis of an addition-of-squares value that is larger than an environment noise level of the radar device by a prescribed value or more.

6. The radar device according to claim 1, wherein the reception antenna of each of the plural antenna system processors is inclined so as to extend in a prescribed direction which is defined by a line connecting the position having the prescribed height and the ground; and
 wherein the incoming direction estimator calculates an elevation angle component of a line connecting the transmission antenna and the target in such a manner that the prescribed direction is used as a reference on the basis of the distance to the target, the prescribed height, and the inclination angle of the transmission antenna and the plural reception antennas.

7. The radar device according to claim 6, wherein the incoming direction estimator calculates evaluation function values for evaluation of a signal incoming direction using the calculated elevation angle component as an elevation angle component of the direction vectors.

8. The radar device according to claim 1, wherein the reception antenna of each of the plural antenna system processors is inclined so as to extend in a prescribed direction which is defined by a line connecting the position having the prescribed height and the ground; and
 wherein the incoming direction estimator calculates a range from an elevation angle component of a line connecting the transmission antenna and a top of the target to an elevation angle component of a line connecting the transmission antenna and a bottom of the target in such a manner that the prescribed direction is used as a reference on the basis of the distance to the target, the prescribed height, a height of the target, and the inclination angle of the transmission antenna and the plural reception antennas.

9. The radar device according to claim 8, wherein the incoming direction estimator calculates evaluation function values for evaluation of a signal incoming direction using the calculated elevation angle component range as an elevation angle component range of the direction vectors.

10. The radar device according to claim 7, wherein the incoming direction estimator calculates a maximum value of the evaluation function values, and judges that an azimuth component of a direction vector that provides the maximum value of the evaluation function values is a signal incoming direction.

11. The radar device according to claim 1, wherein the radar receiver further comprises:
 a mode controller that outputs a switching signal for switching to one of a measurement mode for estimating a distance to and a signal incoming direction from the target and a calibration mode for updating the direction vectors;
 a direction vector calculator that calculates direction vectors corresponding to respective known positions for calibration in the calibration mode; and
 a switch that switches an output destination of the coherent integration outputs of the plural respective antenna system processors to the correlation matrix generator or the direction vector calculator according to the switching signal; and
 wherein the direction vector calculator updates current direction vectors corresponding to the respective known positions to the calculated direction vectors.

12. The radar device according to claim 7, wherein the radar transmitter varies directivity of the radar transmission signal using plural transmission antennas; and
 wherein the incoming direction estimator calculates a maximum value of the evaluation function values on the basis of a prescribed azimuth component range or elevation angle component range of the direction vectors, and judges that an azimuth component of a direction vector that provides the maximum value of the evaluation function values is a signal incoming direction.

13. The radar device according to claim 1, wherein the receiver comprising:
 a correlation matrix generator that generates a correlation matrix including phase difference information that results from an arrangement of reception antennas on the basis of outputs of the plural respective antenna system processors;

a distance estimator that estimates a distance to the target on the basis of the outputs of the plural respective antenna system processors; and an incoming direction estimator that estimates a signal incoming direction from the target using the incoming direction vectors calculated on the basis of an output of the distance estimator and an output of the correlation matrix generator.

14. The radar device according to claim 9, wherein the incoming direction estimator calculates a maximum value of the evaluation function values, and judges that an azimuth component of a direction vector that provides the maximum value of the evaluation function values is a signal incoming direction.

15. The radar device according to claim 9, wherein the radar transmitter varies directivity of the radar transmission signal using plural transmission antennas; and wherein the incoming direction estimator calculates a maximum value of the evaluation function values on the basis of a prescribed azimuth component range or elevation angle component range of the direction vectors, and judges that an azimuth component of a direction vector that provides the maximum value of the evaluation function values is a signal incoming direction.

* * * * *